(12) United States Patent
Sawaoka

(10) Patent No.: US 11,550,290 B2
(45) Date of Patent: Jan. 10, 2023

(54) NUMERICAL CONTROL DEVICE AND CONTROL METHOD

(71) Applicant: FANUC CORPORATION, Yamanashi (JP)

(72) Inventor: Hiroki Sawaoka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/097,155

(22) Filed: Nov. 13, 2020

(65) Prior Publication Data
US 2021/0173375 A1 Jun. 10, 2021

(30) Foreign Application Priority Data
Dec. 4, 2019 (JP) .............................. JP2019-219388

(51) Int. Cl.
G05B 19/404 (2006.01)
B23Q 15/12 (2006.01)

(52) U.S. Cl.
CPC ........... *G05B 19/404* (2013.01); *B23Q 15/12* (2013.01); *G05B 2219/37087* (2013.01)

(58) Field of Classification Search
None
See application file for complete search history.

(56) References Cited

U.S. PATENT DOCUMENTS 4,428,055 A * 1/1984 Zurbrick ............ G05B 19/4015
318/572

FOREIGN PATENT DOCUMENTS

JP 05-318283 12/1993
JP 2016-137557 8/2016

* cited by examiner

*Primary Examiner* — Ryan A Jarrett
(74) *Attorney, Agent, or Firm* — Wenderoth, Lind & Ponack, L.L.P.

(57) ABSTRACT

A numerical control device causes a machine tool to perform cutting with a command coordinate value indicated by a cutting command received from a command analysis unit. The numerical control device includes a dynamic compensation parameter calculation unit that calculates a dynamic compensation parameter for compensating for a dynamic error generated by a force acting on the machine tool and a velocity upon cutting, based on a command shape, and a dynamic compensation unit that compensates for the dynamic error with respect to the command coordinate value, based on the dynamic compensation parameter calculated, in which the dynamic compensation parameter calculation unit acquires only the dynamic error from a comparison of the command shape and the measurement data, and calculates the dynamic compensation parameter from the dynamic error acquired.

9 Claims, 15 Drawing Sheets

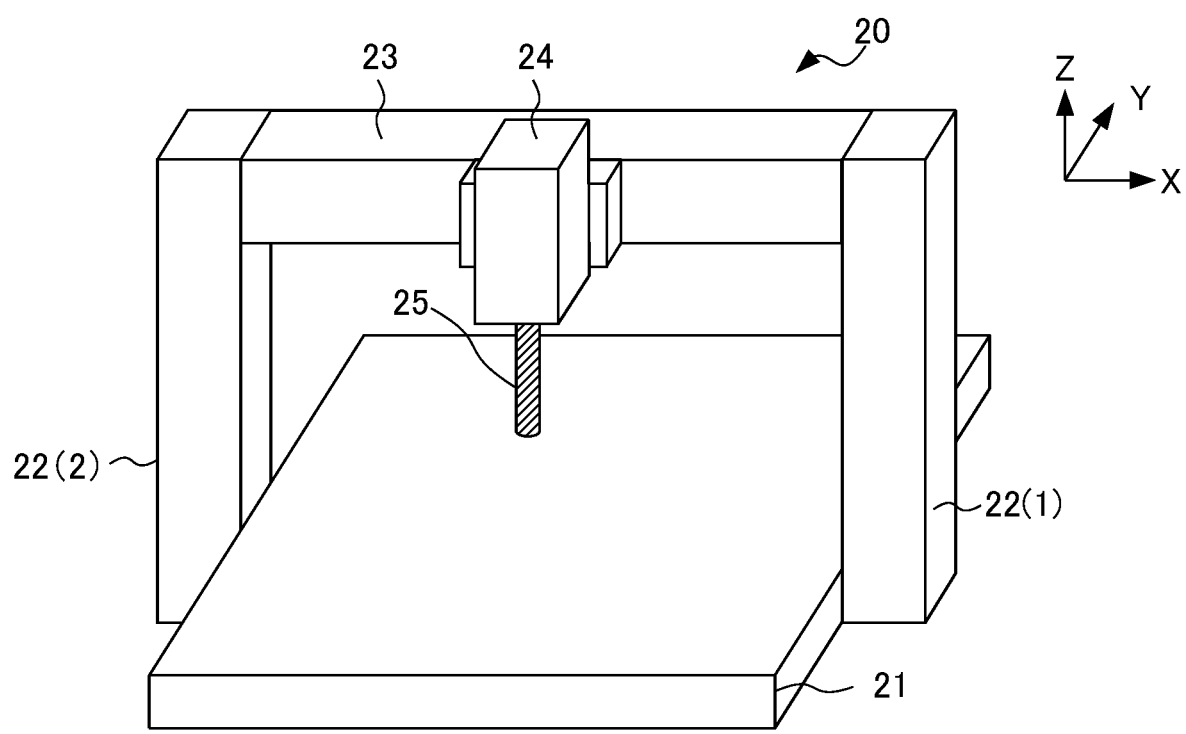

NUMERICAL CONTROL DEVICE AND CONTROL METHOD

This application is based on and claims the benefit of priority from Japanese Patent Application No. 2019-219388, filed on 4 Dec. 2019, the content of which is incorporated herein by reference.

BACKGROUND OF THE INVENTION

Field of the Invention

The present invention relates to a numerical control device and a control method.

Related Art

Rigidity and thermal deformation of machine tools, or deflection of tools, etc., causes an error between the shape of a cut workpiece and the shape of the workpiece at the time of design. To handle such an error, there is a method of using a laser interferometer, an autocollimator, a precision level gauge or the like to measure the motion of a machining machine in advance, and performing compensation based on the measured error.

However, the above-described compensation is intended to compensate the static error, and hence, it is difficult to compensate the dynamic error generated during cutting. It should be noted that the dynamic error refers to an error caused by the force and acting on machine tools and the velocity, for example, an error caused by perpendicularity error of machine tools or deflection of tools, which occurs at a position where the rigidity is low due to the cutting point load.

In this regard, a technique is known in which pressure on a tool is detected using a sensor, and the deflection amount of the tool is compensated based on the detected pressure, whereby it is possible to perform machining with high accuracy even in high-speed cutting. For example, refer to Patent Document 1.

Patent Document 1: Japanese Unexamined Patent Application, Publication No. H5-318283

SUMMARY OF THE INVENTION

However, in order to compensate the deflection amount of the tool, it is necessary to prepare an additional sensor and attach the sensor to the machine tool, which leads to increase in cost.

Furthermore, it is difficult to calculate the relationship between the cutting point load and the deviation in the machining result which is the basis of the compensation amount calculation.

Therefore, it is desired to accurately compensate the dynamic error without using a sensor.

An aspect of the present disclosure relates to a numerical control device that causes a machine tool to perform cutting with a command coordinate value indicated by a cutting command received from a command analysis unit, the numerical control device including: a measurement unit that causes the machine tool to measure on-machine a shape of a cut test workpiece, and acquires measurement data indicating a shape of the test workpiece measured; a dynamic compensation parameter calculation unit that calculates a dynamic compensation parameter for compensating a dynamic error generated by a force acting on the machine tool and a velocity upon cutting, based on a command shape indicated by the cutting command and the measurement data acquired by the measurement unit; and a dynamic compensation unit that compensates the dynamic error with respect to the command coordinate value, based on the dynamic compensation parameter calculated, in which the dynamic compensation parameter calculation unit acquires only the dynamic error from a comparison of the command shape and the measurement data, and calculates the dynamic compensation parameter from the dynamic error acquired.

An aspect of a control method according to the present disclosure relates to a control method for causing a machine tool to perform cutting with a command coordinate value indicated by a cutting command received from a command analysis unit, the control method being realized by a computer and including the steps of: causing the machine tool to measure on-machine a shape of a cut test workpiece and acquiring measurement data indicating a shape of the test workpiece measured; calculating a dynamic compensation parameter for compensating a dynamic error generated by a force acting on the machine tool and a velocity upon cutting, based on a command shape indicated by the cutting command and the measurement data acquired; and compensating the dynamic error with respect to the command coordinate value, based on the dynamic compensation parameter calculated, in which the calculating a dynamic compensation parameter includes acquiring only the dynamic error from a comparison of the command shape and the measurement data, and calculating the dynamic compensation parameter from the dynamic error acquired.

According to one aspect, it is possible to accurately compensate the dynamic error without using a sensor.

BRIEF DESCRIPTION OF THE DRAWINGS

FIG. 2 is a diagram showing an example of a machine tool;

DETAILED DESCRIPTION OF THE INVENTION

First Embodiment

First, an outline of the present embodiment will be described. In the present embodiment, a numerical control device cuts a test workpiece to be described later in a predetermined shape, causes a machine tool to measure on-machine the shape of the test workpiece thus cut, and acquires measurement data indicating the shape of the test workpiece thus measured. The numerical control device calculates a dynamic compensation parameter for compensating a dynamic error generated by a force acting on the machine tool and the velocity upon cutting, based on a command shape indicated by the cutting command and the measurement data acquired. The numerical control device compensates the dynamic error with respect to the command coordinate value, based on the dynamic compensation parameter thus calculated.

Thus, according to the present embodiment, it is possible to solve the object of accurately compensating the dynamic error without using a sensor for detecting pressure due to deflection of a tool.

The outline of the present embodiment is described above. Next, a detailed description will be given of the configuration of the present embodiment with reference to the drawings.

Figure 1:
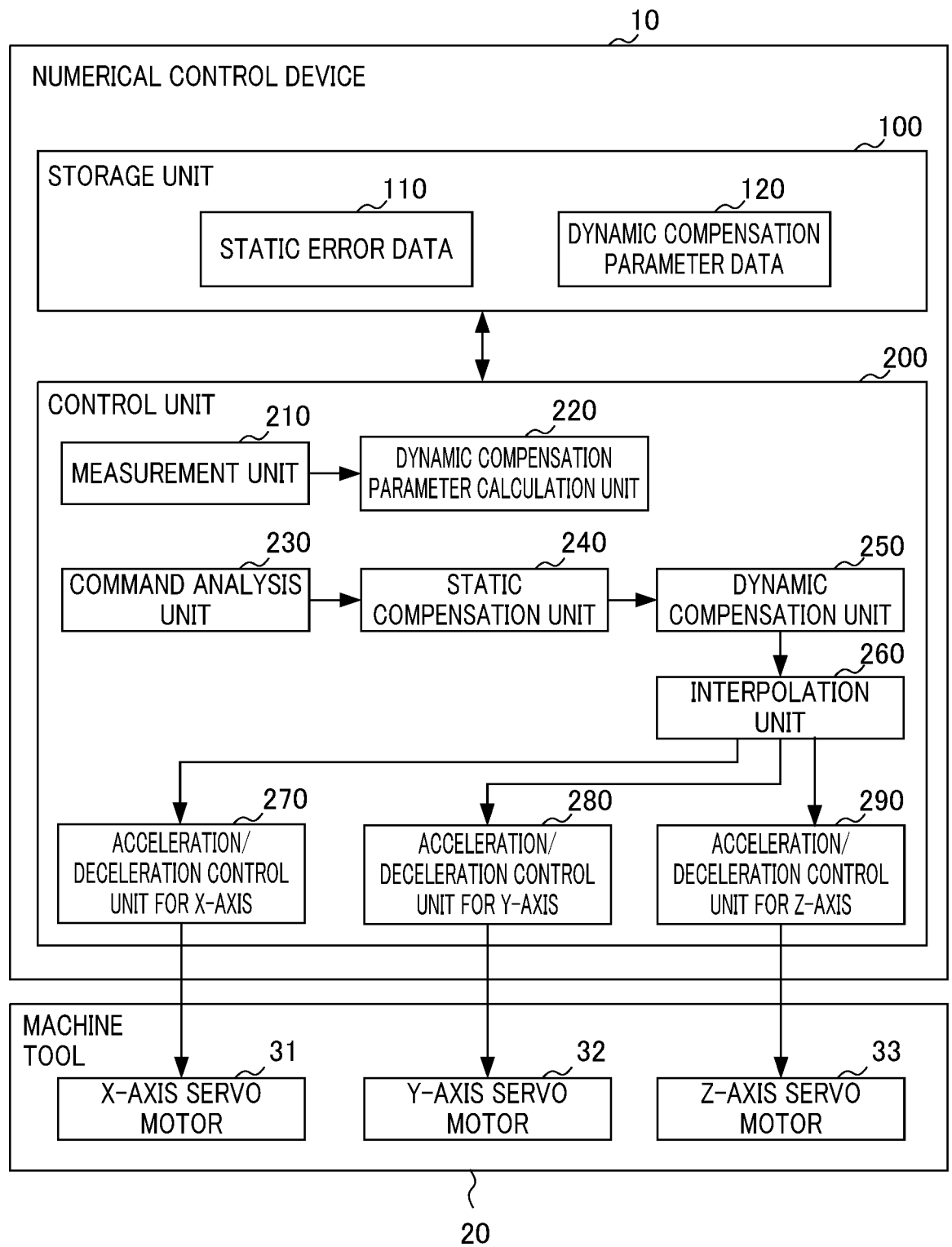
FIG. 1 is a functional block diagram showing a functional configuration example of a numerical control device according to the first embodiment.

FIG. 1 is a functional block diagram showing a functional configuration example of a numerical control device according to the first embodiment. It should be noted that the description based on the viewpoint of a control method can be provided by replacing the "unit" with the "step", and hence, is omitted.

The numerical control device 10 may be directly connected to a machine tool 20 via a connection interface (not shown). The numerical control device 10 and the machine tool 20 may be connected to each other via a network (not shown) such as a LAN (Local Area Network) or the Internet. In this case, the numerical control device 10 and the machine tool 20 are each provided with a communication unit (not shown) for performing communication with each other by such connection.

<Machine Tool 20>

The machine tool 20 is a known orthogonal 3-axis machine tool in which a spindle head moves in the X-axis, Y-axis, and Z-axis directions, and operates based on an operation command (cutting command) from the numerical control device 10.

FIG. 2 is a diagram showing an example of the machine tool 20.

As shown in FIG. 2, the machine tool 20 includes a table (surface table) 21 arranged in an XY plane, support columns 22(1) and 22(2) provided in the vertical (Z-axis) direction at the positions of both ends of the table 21, and a support column 23 provided in the horizontal (X-axis) direction between the support column 22(1) and the support column 22(2).

A spindle head 24 and a tool 25 attached to the spindle head 24 move in the X-axis direction with respect to the support column 23 by an X-axis servo motor 31, and vertically move in the Z-direction relative with respect to the support column 23 by a Z-axis servo motor 33. Furthermore, the support columns 22(1) and 22(2), and the support column 23 constitute a gate, and this gate is moved in the Y-axis direction by a Y-axis servo motor 32.

<Numerical Control Device 10>

The numerical control device 10 is a numerical controller known to those skilled in the art, generates an operation command based on control information, and transmits the generated operation command to the machine tool 20. With such a configuration, the numerical control device 10 controls the operation of the machine tool 20.

As shown in FIG. 1, the numerical control device 10 includes a storage unit 100, and a control unit 200. Furthermore, the control unit 200 includes a measurement unit 210, a dynamic compensation parameter calculation unit 220, a command analysis unit 230, a static compensation unit 240, a dynamic compensation unit 250, an interpolation unit 260, an acceleration/deceleration control unit 270 for the X-axis, an acceleration/deceleration control unit 280 for the Y-axis, and an acceleration/deceleration control unit 290 for the Z-axis.

The storage unit 100 is RAM (Random Access Memory), an HDD (Hard Disk Drive), or the like, and stores static error data 110 and dynamic compensation parameter data 120.

The static error data 110 is a static error that is measured in advance, for example, to compensate the static error acting on the machine tool 20 by the static compensation unit 240 to be described later.

The dynamic compensation parameter data 120 is, for example, a dynamic compensation parameter calculated by the dynamic compensation parameter calculation unit 220 to be described later.

The control unit 200 includes a CPU, ROM, RAM, CMOS memory, and the like, which are configured to be able to perform mutual communication via a bus, and are well known to those skilled in the art.

The CPU is a processor that generally controls the numerical control device 10. The CPU reads the system program and application programs stored in the ROM via the bus, and controls the entire numerical control device 10 in accordance with the system program and the application programs. Thus, as shown in FIG. 1, the control unit 200 is configured to realize the functions of the measurement unit 210, the dynamic compensation parameter calculation unit 220, the command analysis unit 230, the static compensation unit 240, the dynamic compensation unit 250, the interpolation unit 260, the acceleration/deceleration control unit 270 for the X-axis, the acceleration/deceleration control unit 280 for the Y-axis, and the acceleration/deceleration control unit 290 for the Z-axis. Various data such as temporary calculation data and display data are stored in the RAM. The CMOS memory is backed up by a battery (not shown), and is configured as nonvolatile memory in which the storage status is maintained even when the power of the numerical control device 10 is turned off.

The measurement unit 210, for example, conducts on-machine measurement of the shape of a test workpiece (not shown) that is cut by the machine tool 20 based on the cutting command of the machining program analyzed by the command analysis unit 230 to be described later, with a non-contact probe included in the machine tool 20 (not shown). The measurement unit 210 acquires measurement data indicating the shape of the measured test workpiece (not shown) from the machine tool 20.

It should be noted that the measurement of the shape on the machine causes a similar static error both at the time of cutting and the time of measuring, a result of which the static error is canceled out in the on-machine measurement, making it possible to measure only the dynamic error.

The dynamic compensation parameter calculation unit 220 calculates a dynamic compensation parameter for compensating the dynamic error based on the command shape indicated by the cutting command by which the test workpiece (not shown) was cut and the measurement data acquired by the measurement unit 210. The dynamic compensation parameter calculation unit 220 stores the calculated dynamic compensation parameter in the dynamic compensation parameter data 120 of the storage unit 100. The operation of the dynamic compensation parameter calculation unit 220 will be described later.

The command analysis unit 230 sequentially reads and analyzes a block including a command for the movement of the X-axis, the Y-axis, and the Z-axis from the machining program, and generates a cutting command including a command coordinate value of the movement of each axis based on the analysis result.

The static compensation unit 240 reads the static error from the static error data 110, and compensates the command coordinate value of the cutting command generated by the command analysis unit 230 based on the read static error.

The dynamic compensation unit 250 reads the dynamic compensation parameter calculated by the dynamic compensation parameter calculation unit 220 from the dynamic compensation parameter data 120, and compensates the dynamic error with respect to the command coordinate value of the cutting command based on the read dynamic compensation parameter.

The interpolation unit 260 generates interpolation data generated by interpolation calculation for the points on the command path in an interpolation period, based on the movement command commanded by the cutting command outputted from the dynamic compensation unit 250.

The acceleration/deceleration control unit 270 for the X-axis calculates the machining velocity of the X-axis for each interpolation period by performing acceleration/deceleration processing based on the interpolation data outputted from the interpolation unit 260, and outputs a pulse corresponding to the calculated machining velocity to the X-axis servo motor 31 of the machine tool 20.

The acceleration/deceleration control unit 280 for the Y-axis performs the acceleration/deceleration processing based on the interpolation data outputted from the interpolation unit 260 to calculate the machining velocity of the Y-axis for each interpolation period, and outputs a pulse corresponding to the calculated machining velocity to the Y-axis servo motor 32 of the machine tool 20.

The acceleration/deceleration control unit 290 for the Z-axis performs the acceleration/deceleration processing based on the interpolation data outputted from the interpolation unit 260 to calculate the machining velocity of the Z-axis for each interpolation period, and outputs a pulse corresponding to the calculated machining velocity to the Z-axis servo motor 33 of the machine tool 20.

Next, a description will be given for the calculation of the dynamic compensation parameter by the dynamic compensation parameter calculation unit 220. It should be noted that the dynamic error in the machine tool 20 includes perpendicularity error and error due to deflection of the tool 25.

Figure 3A:
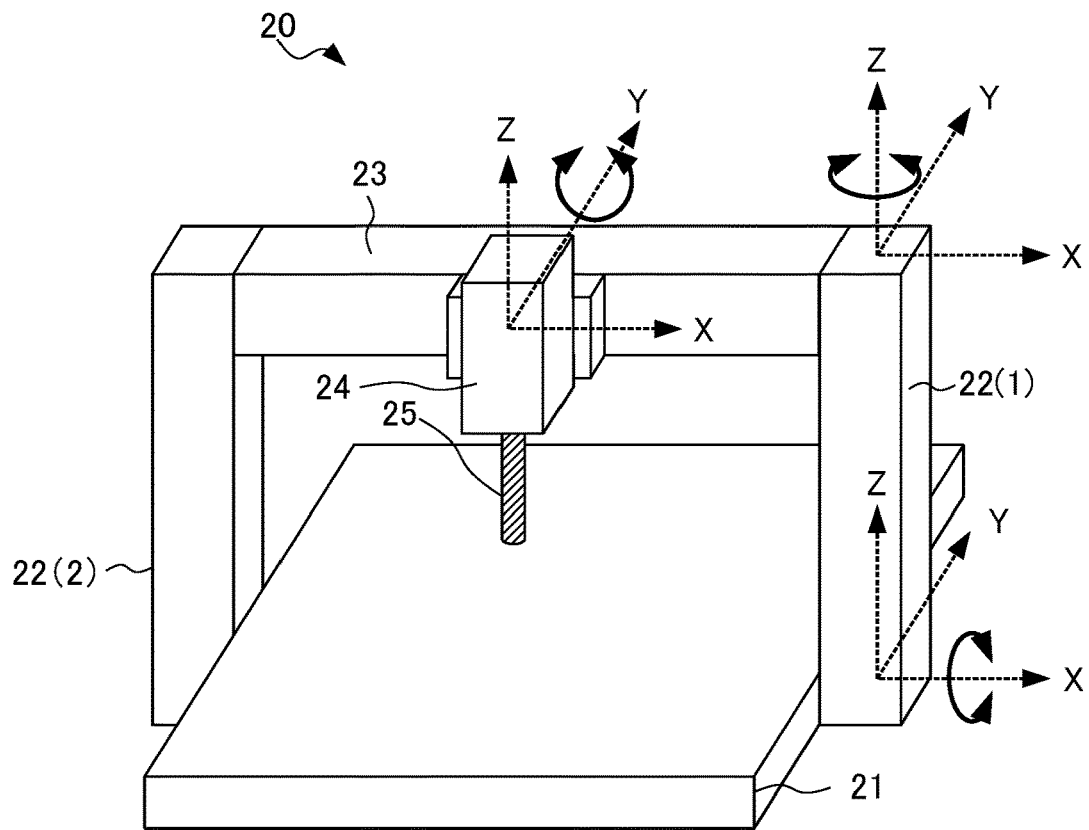
FIG. 3A is a diagram showing an example of perpendicularity error.
Figure 3B:
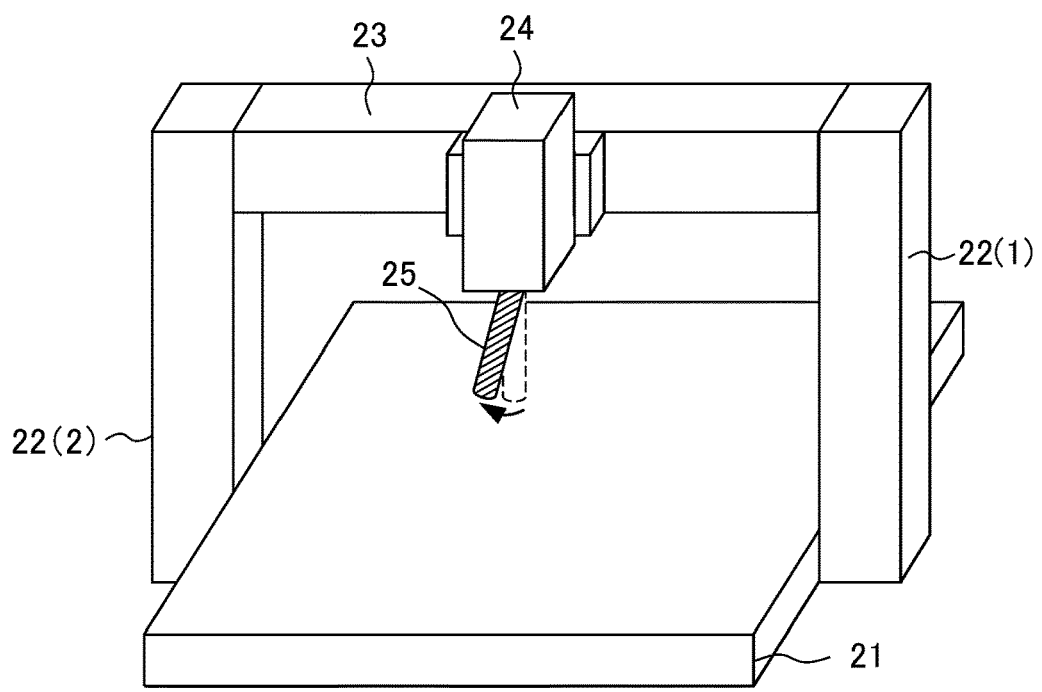
FIG. 3B is a diagram showing an example of an error caused by deflection of a tool.

FIG. 3A is a diagram showing an example of perpendicularity error. FIG. 3B is a diagram showing an example of error caused by deflection of the tool 25.

As shown in FIG. 3A, the perpendicularity error occurs when the rigidity between axes is low in an ultra-precision machining machine, etc., for example, at a joint or the like such as a joint of the table 21 and the support columns 22(1) and 22(2), a joint of the support columns 22(1) and 22(2), and the support column 23, and the support column 23 and the spindle head 24.

On the other hand, as shown in FIG. 3B, the error due to the deflection of the tool occurs, for example, in the tool 25 mounted on the spindle head 24, when the rigidity of the machine tool 20 is high but the cutting point load is large.

In the following, the calculation of the dynamic compensation parameter for the perpendicularity error and the calculation of the dynamic compensation parameter for the deflection of the tool 25 will be described.

<Regarding Calculation of Dynamic Compensation Parameters for Perpendicularity Error>

Figure 4:
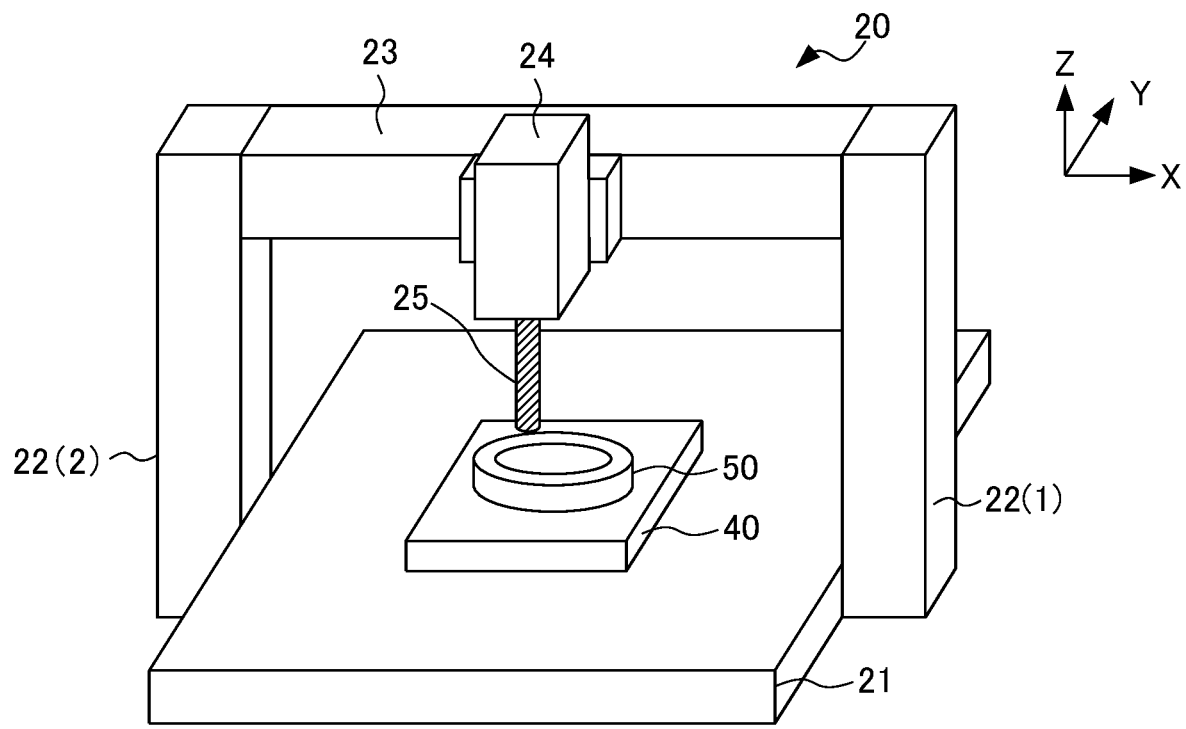
FIG. 4 is a diagram showing an example in which a test workpiece is cut by the machine tool.

As shown in FIG. 4, in order to calculate the dynamic compensation parameter for perpendicularity error, the numerical control device 10 causes the machine tool 20 to cut a hole having the radius $R_0$ on the test workpiece 50 fixed to a jig 40 in the XY plane with the height in the Z-axis direction constant. It should be noted that the cutting of the test workpiece 50 shall be performed, for example, under the same machining conditions as the cutting of a workpiece serving as an actual article, such as the machining of the tool 25 and the workpiece of the same material. In so doing, the calculated dynamic compensation parameters can be applied during cutting of the workpiece serving as the actual article.

The numerical control device 10 then causes the machine tool 20 to measure on-machine the cut holes with a contact probe (not shown). The measurement unit 210 of the numerical control device 10 acquires measurement data indicating the shape of the test workpiece 50 measured on-machine from the machine tool 20.

Thus, by measuring the shape on the machine, static error occurs in the same way both at the time of cutting and at the time of measuring, a result of which the static error is canceled out in the on-machine measurement, making it possible to measure only the dynamic error.

The dynamic compensation parameter calculation unit 220 calculates a dynamic compensation parameter based on the command shape indicated by the cutting command by which the test workpiece 50 was cut and the acquired measurement data.

Figure 5:
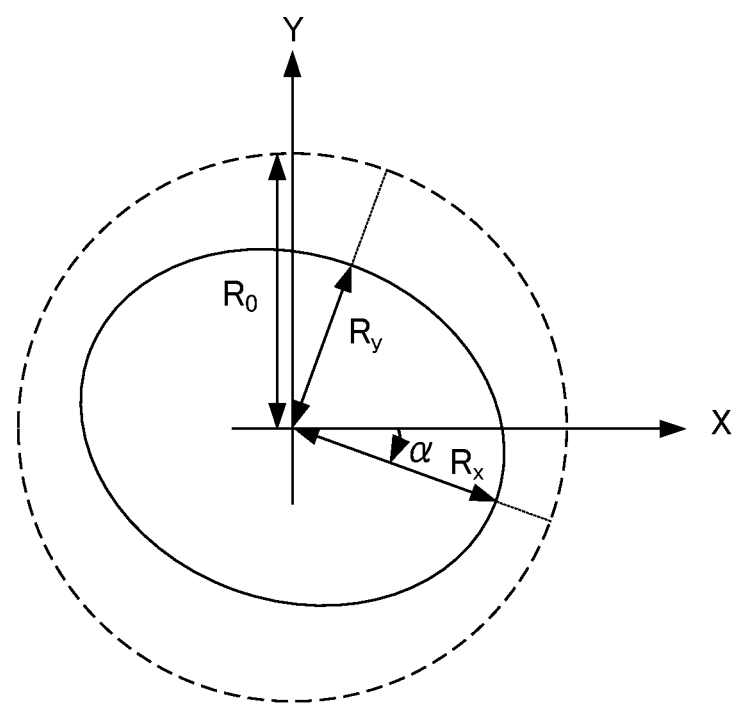
FIG. 5 is a diagram showing an example of a deviation amount in a case in which a cutting point load is also applied in the circumferential direction.

More specifically, the dynamic compensation parameter calculation unit 220 calculates an ellipse $((x/R_x)^2+(y/R_y)^2=1)$ that best-fits the measurement data indicated by a solid line, for example, by the least squares method or the like, as shown in FIG. 5. The circle denoted by a broken line in FIG. 5 shows the command shape of the hole having the radius $R_0$.

It should be noted that the cutting point load at the time of cutting of the test workpiece 50 is applied not only in the radial direction of the circle, but also in the circumferential direction of the circle, depending on the amount of cut. Thus, as shown in FIG. 5, the best-fit ellipse is inclined by angle $\alpha$. In other words, in a case in which the movement command position $R_n$ indicated by the cutting command is $R_0 (\cos \theta, \sin \theta)$, the machining shape position $R_a$ indicated by the measurement data is $(R_x \cos(\theta-\alpha), R_y \sin(\theta-\alpha))$.

Furthermore, the deviation amounts $\delta_0$ and $\delta_{90}$ in a case in which the angle $\theta$ of the machining shape position $R_a$ is 0 degrees and 90 degrees are expressed as in Expression 1. Here, the directions of the deviation amounts $\delta_0$ and $\delta_{90}$ are each X-axis parallel and the Y-axis parallel.

$$\delta_0 = R_0 \sqrt{1 - \left(\frac{R_y}{R_0}\sin\alpha\right)^2} - R_x \cos\alpha$$

$$\delta_{90} = R_0 \sqrt{1 - \left(\frac{R_x}{R_0}\sin\alpha\right)^2} - R_y \cos\alpha$$

[Expression 1]

By using the deviation amount $\delta$ of Expression 1, the dynamic compensation parameters $W_{zx}$ and $W_{zy}$ are expressed as in Expression 2.

$$W_{zx} = \delta_0/(H_z - H_w)$$

$$W_{zy} = \delta_{90}/(H_z - H_w)$$

[Expression 2]

Figure 6:
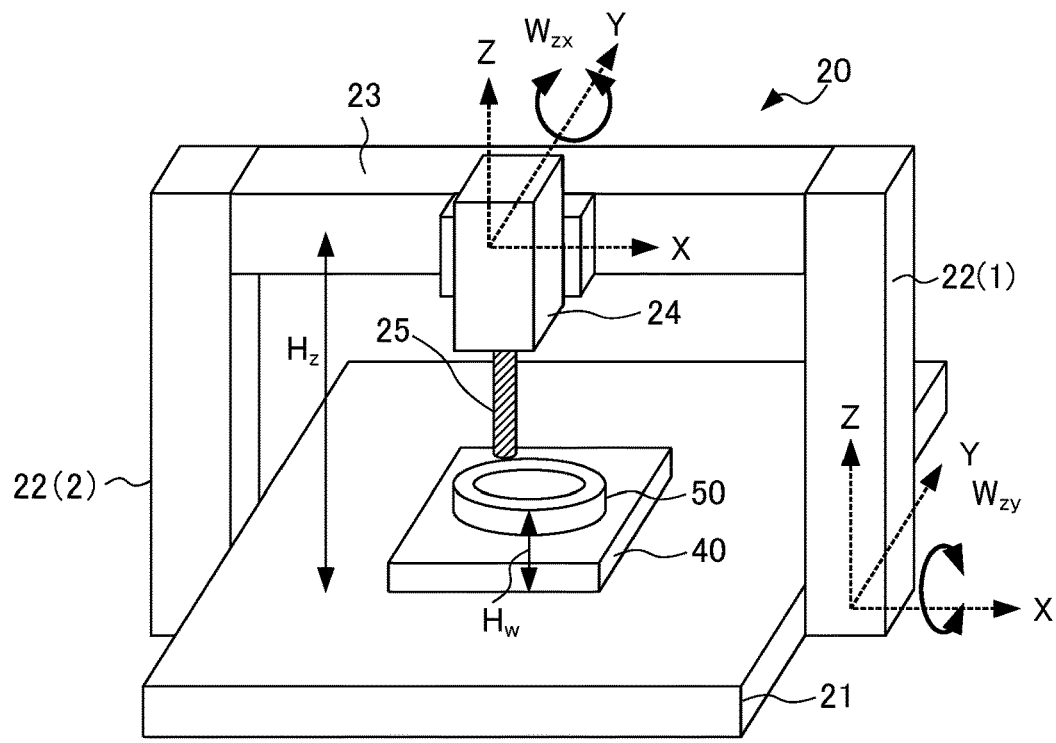
FIG. 6 is a diagram showing an example of a relationship between a dynamic compensation parameter and a machine tool.

Here, as shown in FIG. 6, $H_z$ indicates the height from the table (surface table) 21 to the X-axis of the spindle head 24, and $H_w$ indicates the height from the table (surface table) 21 to the test workpiece 50.

It should be noted that, in a case in which the cutting point load at the time of cutting of the test workpiece 50 is ideally only in the radial direction of the circle, the ellipse to best-fit is not inclined, and hence, the angle $\alpha=0$.

Figure 7:
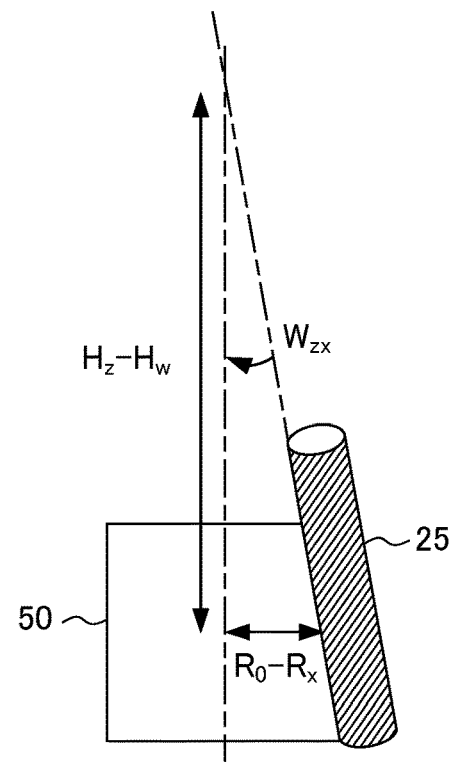
FIG. 7 is a diagram showing an example for explaining a dynamic compensation parameter of perpendicularity error.

In line with the above, in a case in which the perpendicularity error occurs at the cutting point load, as shown in FIG. 7, the dynamic compensation parameters $W_{zx}$ and $W_{zy}$ of Expression 2 is expressed as in Expression 3. That is, the perpendicularity error is an error that occurs due to the right angle of each axis being shifted.

$$W_{zx} = (R_0 - R_x)/(H_z - H_w)$$

$$W_{zy} = (R_0 - R_y)/(H_z - H_w)$$

[Expression 3]

In this case, the deviation amount $\delta$ is expressed by Expression 4.

$$\delta = R_n - R_a$$

$$= ((R_0 - R_x)\cos\theta, (R_0 - R_y)\sin\theta)$$

[Expression 4]

Furthermore, since the direction of the cutting point load $F (=(F_x, F_y))$ is a radial direction, $F/|F|=-(\cos\theta, \sin\theta)$ is given, and hence, the deviation amount $\delta$ is expressed as in Expression 5 using the cutting point load F.

$$\delta = (H_z - H_w)\left(W_{zx}\frac{F_x}{|F|}, W_{zy}\frac{F_y}{|F|}\right)$$

[Expression 5]

-continued $$= z\left(W_{zx}\frac{F_x}{|F|}, W_{zy}\frac{F_y}{|F|}\right)$$

$H_z - H_w$ is the height z of the machining.

It should be noted that the direction of the cutting point load at the time of machining a workpiece serving as an actual article, that is, the direction in a case in which the cutting point load is applied not only in the diametrical direction but also in the circumferential direction of the circle, may be calculated by performing a machining simulation from the CAD model and the machining plan of the article using a known method (for example, Takashi Matsumura, "Trends and Issues in Cutting Simulation Technologies", Journal of the Japan Society for Precision Engineering, Vol. 80, No. 9, 2014).

Furthermore, as described later in the third embodiment, the direction of the cutting point load at the time of machining a workpiece serving as an actual article may be estimated from, for example, the torques of the X-axis servo motor 31, Y-axis servo motor 32, and the Z-axis servo motor 33. Alternatively, the direction of the cutting point load F at the time of machining the workpiece serving as the actual article may be detected using a sensor attached to the tool 25.

Furthermore, the dynamic compensation parameter calculation unit 220 calculates the dynamic compensation parameters $W_{zx}$ and $W_{zy}$ using Expressions 1 and 2, and stores the calculated dynamic compensation parameters $W_{zx}$ and $W_{zy}$ in the dynamic compensation parameter data 120.

Thereafter, the dynamic compensation unit 250 reads the dynamic compensation parameters $W_{zx}$ and $W_{zy}$ from the dynamic compensation parameter data 120 in a case in which the workpiece serving as an actual article is cut. The dynamic compensation unit 250 can compensate the dynamic error of the perpendicularity error with respect to the command coordinate value of the cutting command for the workpiece serving as the actual article based on the read dynamic compensation parameters $W_{zx}$ and $W_{zy}$.

<Regarding Calculation of Dynamic Compensation Parameter for Error Due to Deflection of Tool 25>

As in the case of the perpendicularity error, in order to calculate the dynamic compensation parameter for error due to deflection of the tool 25, the numerical control device 10 causes the machine tool 20 to cut a hole having the radius $R_0$ in the test workpiece 50 fixed to the jig 40 in the XY plane with the height in the Z-axis direction constant. It should be noted that the cutting of the test workpiece 50 shall be performed, for example, under the same machining conditions as the cutting of the workpiece serving as an actual article, such as the machining of the tool 25 and the workpiece of the same material. In so doing, the calculated dynamic compensation parameters can be applied during cutting of the workpiece serving as the actual article.

The numerical control device 10 then causes the machine tool 20 to measure on-machine the cut holes with a contact probe (not shown). The measurement unit 210 of the numerical control device 10 acquires measurement data indicating the shape of the test workpiece 50 measured on-machine from the machine tool 20.

The dynamic compensation parameter calculation unit 220 calculates a dynamic compensation parameter based on the command shape indicated by the cutting command by which the test workpiece 50 was cut and the acquired measurement data.

Figure 8:
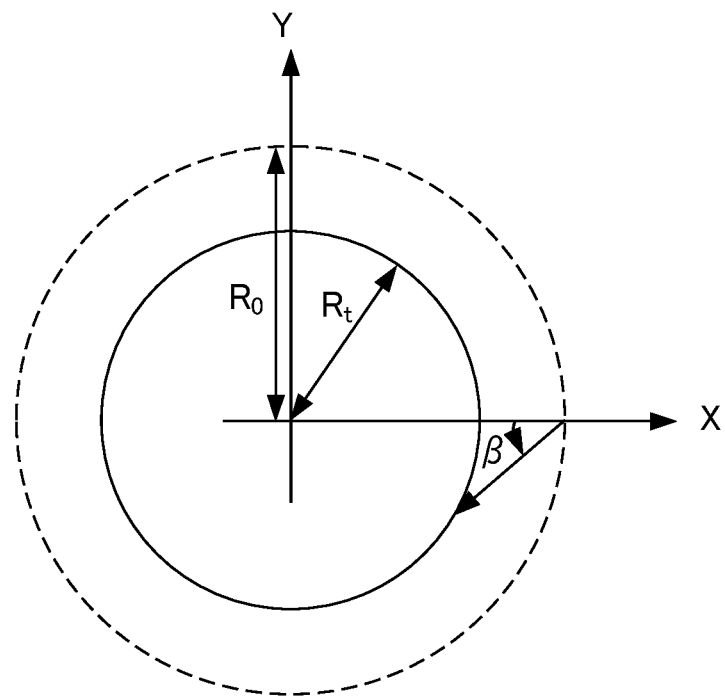
FIG. 8 is a diagram showing an example of best-fitting a circle to measurement data.

More specifically, since there is no anisotropy in the deflection of the tool 25, the dynamic compensation parameter calculation unit 220 calculates a circle ($x^2+y^2=R_t^2$) that best-fits the measurement data indicated by the solid line, for example, by the least squares method or the like, as shown in FIG. 8. It should be noted that the circle denoted by a broken line in FIG. 8 shows the command shape of the hole having the radial $R_0$, as in the case of FIG. 5.

Figure 9:
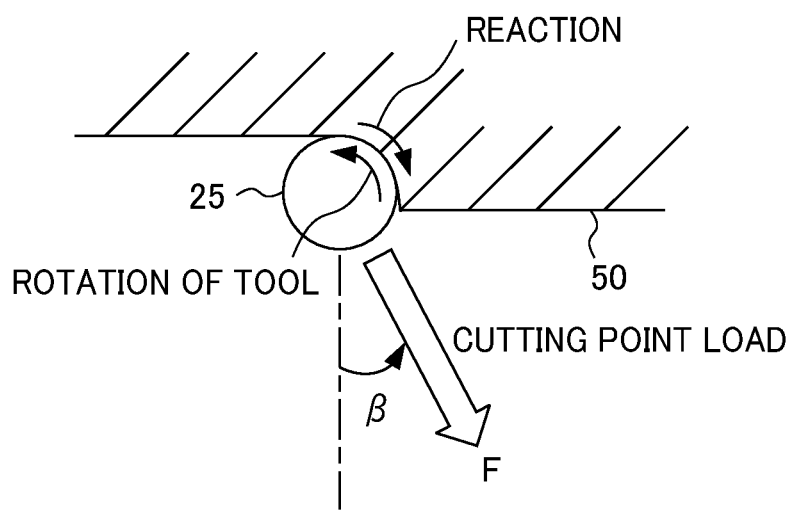
FIG. 9 is a diagram showing an example of the direction of the cutting point load.

However, as shown in FIG. 9, the direction of the cutting point load F is inclined by angle β with respect to the normal line of the test workpiece 50 due to the rotation of the tool 25 and the reaction from the test workpiece 50 to the rotation thereof. Therefore, the commanded position and the actual cutting position are deviated from each other as shown in FIG. 8. Therefore, the dynamic compensation parameter calculation unit 220 calculates the inclination β in the direction of the cutting point load F by using a known method (for example, Kazuo Taniguchi, "Analytical Research on Cutting Mechanics of Metal-Report 3: Analysis of Cutting Stress-)", Journal of the Japan Society of Precision Engineering, Vol. 29, No. 3, 1963).

Thus, the coefficient (dynamic compensation parameter) $W_t$ of the deflection amount of the tool 25 generated at the cutting point load is expressed as in Expression 6.

$$W_t = \frac{(R_0 - R_t)}{L_t \cos\beta} \quad \text{[Expression 6]}$$

$L_t$ represents the tool length. The deviation amount δ is expressed by Expression 7.

$$\delta = L_t W_t \frac{F}{|F|} \quad \text{[Expression 7]}$$

The dynamic compensation parameter calculation unit 220 calculates the dynamic compensation parameter $W_t$ using Expression 6, and stores the calculated dynamic compensation parameter $W_t$ in the dynamic compensation parameter data 120.

Thereafter, the dynamic compensation unit 250 reads the dynamic compensation parameter $W_t$ from the dynamic compensation parameter data 120 in a case of cutting a workpiece serving as an actual article. The dynamic compensation unit 250 compensates the dynamic error due to the deflection of the tool 25 with respect to the command coordinate value of the cutting command for the workpiece serving as the actual article based on the read dynamic compensation parameter $W_t$.

Figure 10:
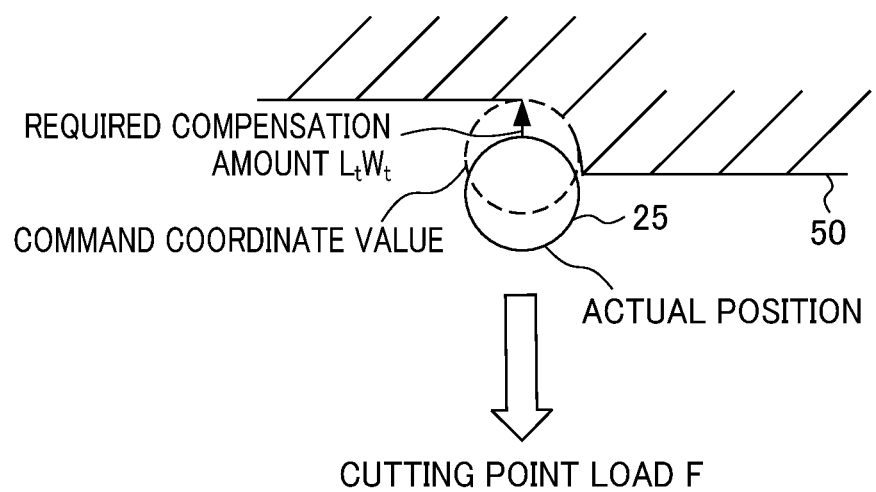
FIG. 10 is a diagram showing an example of compensation of error due to deflection of a tool.

Thus, as shown in FIG. 10, it is possible to move the tool 25 located at the actual position denoted by the solid line to the position of the command coordinate value denoted by the broken line.

As described above, the numerical control device 10 according to the first embodiment measures on-machine the shape of the cut test workpiece 50, and acquires the measurement data of the shape of the measured test workpiece 50. The numerical control device 10 calculates a dynamic compensation parameter to compensate the dynamic error based on the command shape of the cutting command and the acquired measurement data. The numerical control device 10 can compensate the dynamic error with respect to the command coordinate value based on the calculated dynamic compensation parameter.

Thus, it is possible for the numerical control device 10 to accurately compensate the dynamic error without using a sensor for detecting the pressure due to deflection of the tool.

Furthermore, the numerical control device 10 eliminates the need for investigating in advance the relationship between the cutting point load to be measured by the sensor or the like and the deflection of the tool, by calculating the dynamic compensation parameter.

The first embodiment is described above.

Modification Examples of First Embodiment

In the first embodiment described above, the numerical control device 10 compensates the dynamic error with respect to the command coordinate value of the cutting command generated by analyzing the machining program; however, the present invention is not limited thereto. For example, the numerical control device 10 may add a compensation pulse for compensating the dynamic error to the pulse outputted to the X-axis servo motor 31, Y-axis servo motor 32, and Z-axis servo motor 33 of the machine tool 20.

Figure 11:
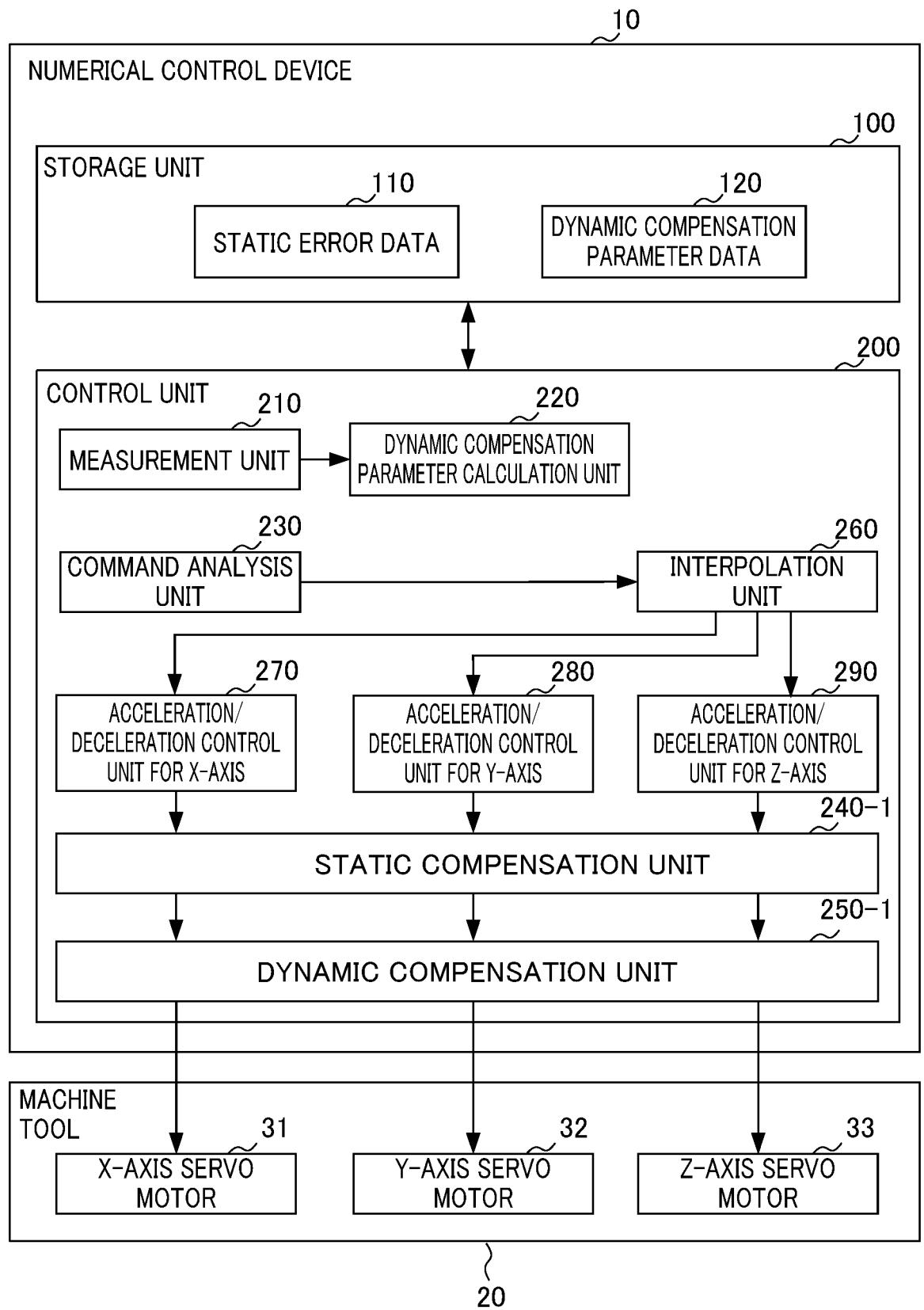
FIG. 11 is a diagram showing an example of a numerical control device according to the first embodiment.

FIG. 11 is a diagram showing an example of the numerical control device 10 according to the first embodiment.

As shown in FIG. 11, a static compensation unit 240-1 and a dynamic compensation unit 250-1 are disposed after the acceleration/deceleration control unit 270 for the X-axis, the acceleration/deceleration control unit 280 for the Y-axis, and the acceleration/deceleration control unit 290 for the Z-axis. Furthermore, the static compensation unit 240-1 and the dynamic compensation unit 250-1 compensate the static error and the dynamic error by adding the compensation pulse for compensating the static error and the compensation pulse for compensating the dynamic error to the pulse outputted from each of the acceleration/deceleration control unit 270 for the X-axis, the acceleration/deceleration control unit 280 for the Y-axis, and the acceleration/deceleration control unit 290 for the Z-axis. It should be noted that the static compensation unit 240-1 and the dynamic compensation unit 250-1 perform the same operation as the static compensation unit 240 and the dynamic compensation unit 250 of FIG. 1 except that the compensation pulse of the static error and the compensation pulse of the dynamic error are added.

Furthermore, the numerical control device 10 may incorporate a compensation amount for dynamic compensation into the tool diameter of the tool 25.

Figure 12:
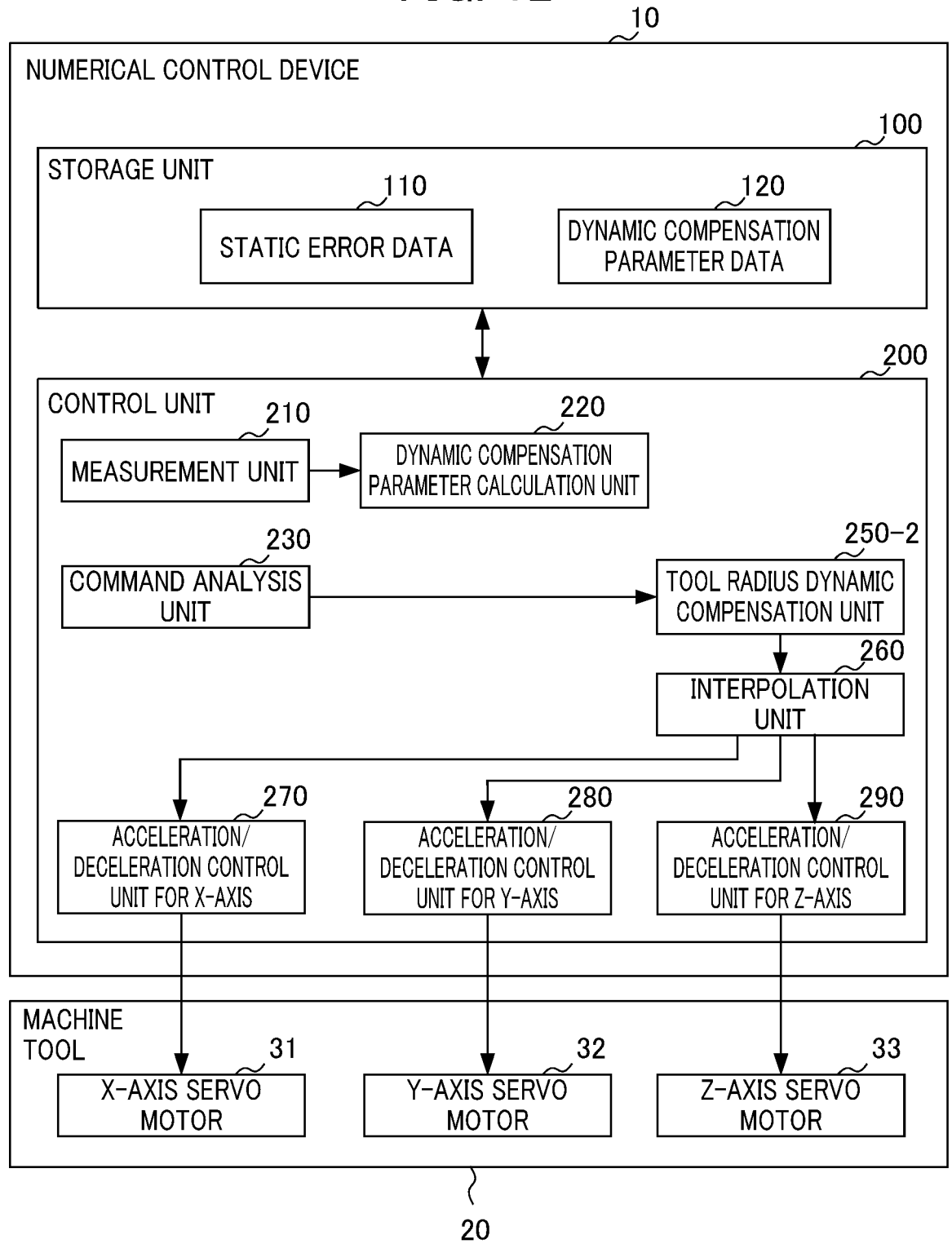
FIG. 12 is a diagram showing an example of the numerical control device according to the first embodiment.

FIG. 12 is a diagram showing an example of the numerical control device 10 according to the first embodiment.

A tool radius compensation unit 250-2 shown in FIG. 12 performs dynamic compensation for the error caused by deflection of the tool 25. In this case, the tool radius compensation unit 250-2 may incorporate the compensation amount calculated using the dynamic compensation parameter $W_t$ calculated by Expression 6 into the tool radius $r_t$ of the tool 25 based on Expression 8 to calculate the tool radius compensation amount $r_t'$.

$$r_t' = r_t - L_t \cos\beta' W_t \quad \text{[Expression 8]}$$

Figure 13:
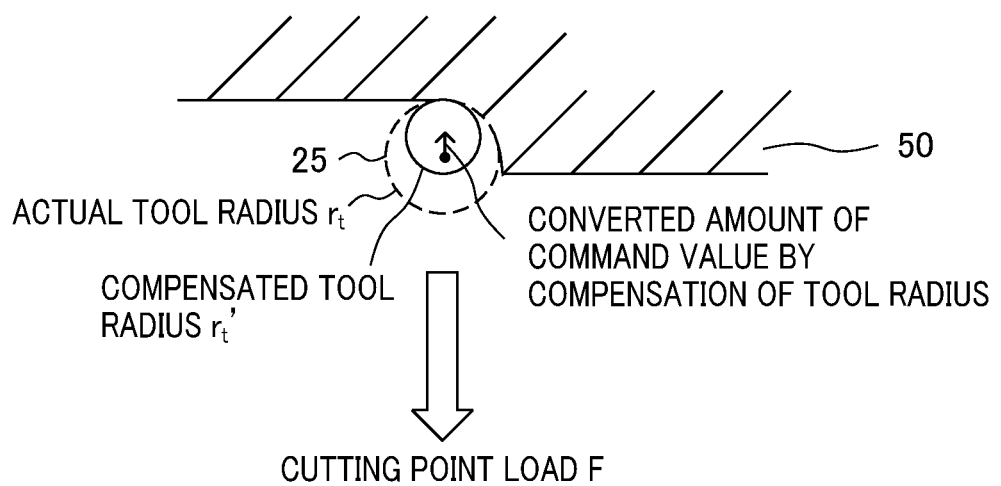
FIG. 13 is a diagram showing an example of compensation of error due to deflection of a tool.

It should be noted that indicates the inclination of the direction of the cutting point load F at the time of actual cutting. Then, in a case in which the inclination β' is the same as the inclination β, in the direction of the cutting point load F at the time of cutting of the test workpiece 50, as shown in FIG. 13, Expression 8 is expressed as in Expression 9.

$$r_t' = r_t - (R_0 - R_t) \quad \text{[Expression 9]}$$

It should be noted that, in the numerical control device 10 of FIG. 12, although the static compensation unit 240 is omitted, it may have the static compensation unit 240.

Second Embodiment

Next, a second embodiment will be described. In the first embodiment, in a case in which there is a difference in the magnitude of the load between the time of machining of the test workpiece 50 and the time of machining of the workpiece serving as the actual article, the difference is not considered. In this case, for example, it is possible to automatically change the cutting condition so that the difference in the magnitude of the cutting load becomes equal to or less than a predetermined value, i.e., within a range in which the numerical control device 10 functions normally, by using a known method such as in Japanese Unexamined Patent Application, Publication No. 2016-137557; however, the cutting condition is forced to be changed. Therefore, in the second embodiment, the numerical control device 10 uses a plurality of dynamic compensation parameters calculated by cutting the test workpiece with each of a plurality of different cutting loads from each other to interpolate the dynamic compensation parameter in any cutting load, thereby compensating the command coordinate value of the cutting command based on the dynamic compensation parameter in any cutting load interpolated, in addition to the function of the first embodiment.

Thus, it is possible for the numerical control device 10 of the second embodiment to compensate the dynamic error appropriately even when the magnitude of the cutting point load at the time of machining of the test workpiece is different from the magnitude of the cutting point load at the time of machining of a workpiece serving as an actual article.

The second embodiment will be described below.

Figure 14:
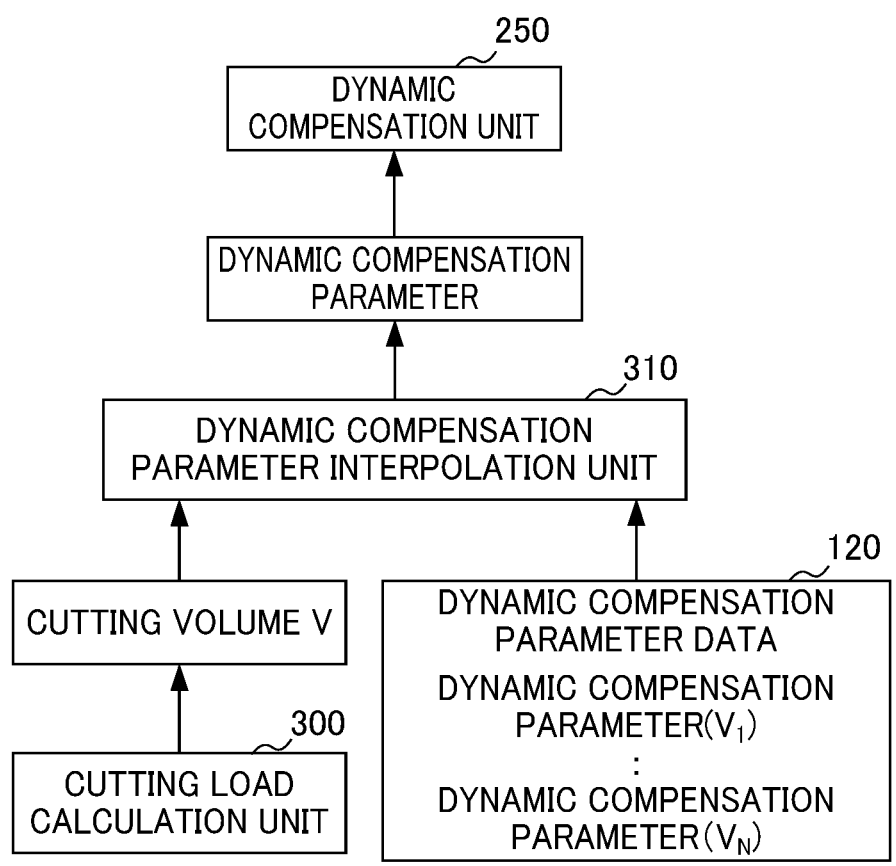
FIG. 14 is a functional block diagram showing a functional configuration example added to the numerical control device according to the first embodiment in a numerical control device according to the second embodiment.

FIG. 14 is a functional block diagram showing a functional configuration example added to the numerical control device 10 of the first embodiment in a numerical control device according to the second embodiment. Elements having the same functions as those of the elements of the numerical control device 10 of FIG. 1 are denoted by the same reference numerals, and a detailed description thereof is omitted.

Hereinafter, since there is a strong correlation between the cutting load and the cutting volume per unit time, a description will be given with the cutting volume V per unit time as a variable, instead of the cutting load.

As shown in FIG. 14, a control unit 200 further includes a cutting load calculation unit 300, and a dynamic compensation parameter interpolation unit 310. Each of these functional units is realized by the control unit 200 executing a system program and an application program stored in ROM (not shown) of the control unit 200.

It should be noted that the machine tool 20 causes the measurement unit 210 to measure on-machine a plurality of cutting loads of machine tool 20 different from each other based on the cutting command of the machining program analyzed by the command analysis unit 230, i.e., the shape of each of the test workpiece 50 cut in each of the plurality of cutting volumes $V_1$ to $V_N$, with a non-contact probe (not shown) of the machine tool 20. Here, N is an integer of 2 or more. The measurement unit 210 acquires the measurement data of the shape of each test workpiece 50 measured from the machine tool 20.

In the case of perpendicularity error, the dynamic compensation parameter calculation unit 220 calculates the dynamic compensation parameters $\{W_{zx}(V_i)|1\leq i\leq N$, N is an integer of 2 or more$\}$ and $\{W_{zy}(V_i)|1\leq i\leq N\}$ based on the command shape of the cutting command when the test workpiece 50 is cut in each of the plurality of cutting volumes $V_1$ to $V_N$, and the measurement data acquired by the measurement unit 210, using Expressions 1 and 2.

Furthermore, in the case of error due to deflection of the tool 25, the dynamic compensation parameter calculation unit 220 calculates a dynamic compensation parameter $\{W_t(V_i)|1\leq i\leq N\}$ from Expression 6 based on the command shape of the cutting command when the test workpiece 50 is cut in each of the plurality of cutting volumes $V_1$ to $V_N$ and the measurement data acquired by the measurement unit 210.

Furthermore, the dynamic compensation parameter calculation unit 220 stores the dynamic compensation parameters $\{W_{zx}(V_i)|1\leq i\leq N\}$ and $\{W_{zy}(V_i)|1\leq i\leq N\}$ of the perpendicularity error of each cutting point load, and the dynamic compensation parameter of the error due to the deflection of the tool 25 $\{W_t(V_z)|1\leq i\leq N\}$ in association with each of the cutting volumes $V_1$ to $V_N$ in the dynamic compensation parameter data 120.

The cutting load calculation unit 300 calculates the cutting volume V per unit time based on the machining conditions of the machining program analyzed by the command analysis unit 230. It should be noted that a known method can be used as a method for calculating the cutting volume V from the machining conditions, and hence, a description thereof is omitted.

The dynamic compensation parameter interpolation unit 310 reads a plurality of dynamic compensation parameters $\{W_{zx}(V_i)|1\leq i\leq N\}$ and $\{W_{zy}(V_z)|1\leq i\leq N\}$ (or a plurality of dynamic compensation parameters $\{W_t(V_i)|1\leq i\leq N\}$) from the dynamic compensation parameter data 120. The dynamic compensation parameter interpolation unit 310 interpolates the dynamic compensation parameters $W_{zx}(V)$ and $W_{zy}(V)$ (or the dynamic compensation parameter $W_t(V)$) in the cutting volume V calculated by the cutting load calculation unit 300 using a plurality of read dynamic compensation parameters $\{W_{zx}(V_z)|1\leq i\leq N\}$ and $\{W_{zy}(V_z)|1\leq i\leq N\}$ (or a plurality of dynamic compensation parameters $\{W_t(V_z)|1\leq i\leq N\}$).

The interpolation of the dynamic compensation parameter with respect to the perpendicularity error and the interpolation of the dynamic compensation parameter with respect to the deflection of the tool 25 will be described below.

<Regarding Interpolation of Dynamic Compensation Parameter for Perpendicularity Error>

Figure 15A:
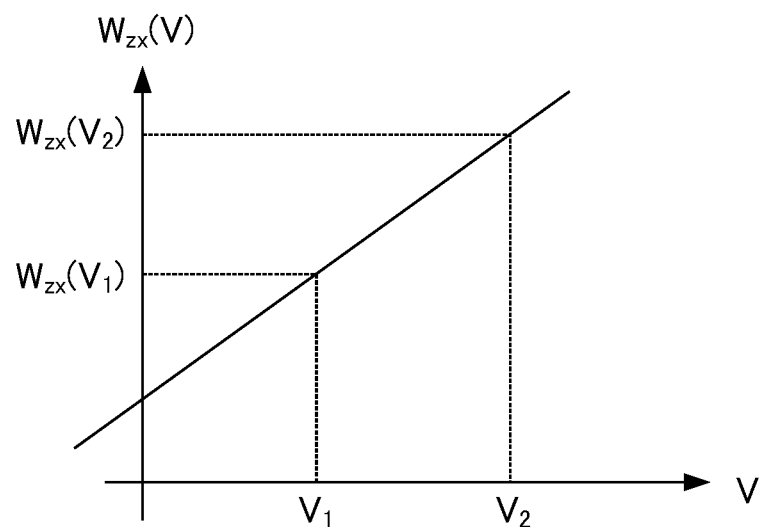
FIG. 15A is a diagram showing an example of interpolation processing of a dynamic compensation parameter interpolation unit.
Figure 15B:
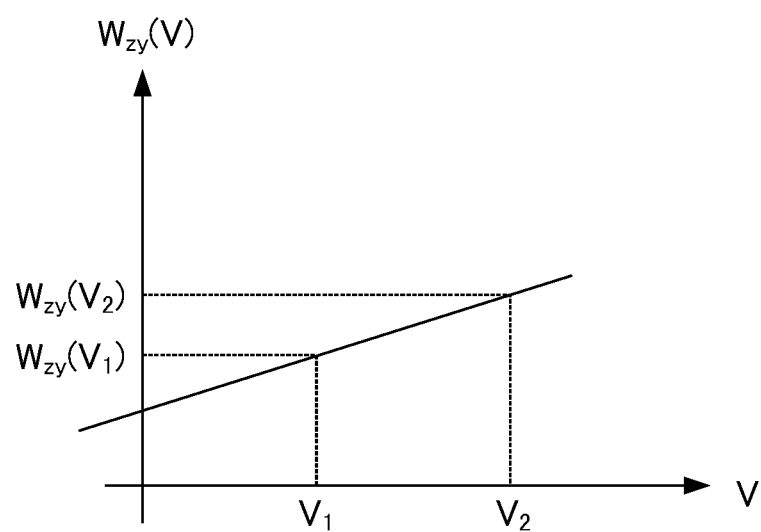
FIG. 15B is a diagram showing an example of the interpolation processing of the dynamic compensation parameter interpolation unit.

FIGS. 15A and 15B are diagrams showing examples of interpolation processing of the dynamic compensation parameter interpolation unit 310. It should be noted that FIG. 15A shows the case of the dynamic compensation parameter $W_{zx}(V)$, and FIG. 15B shows the case of the dynamic compensation parameter $W_{zy}(V)$. Furthermore, FIGS. 15A and 15B show cases where N=2; however, the same applies to the case where N is 3 or more.

For example, as shown in FIG. 15A, the dynamic compensation parameter interpolation unit 310 linearly interpolates the dynamic compensation parameters $W_{zx}(V_1)$ and $W_{zx}(V_2)$ to calculate the dynamic compensation parameter $W_{zx}(V)$ in the cutting volume V calculated by the cutting load calculation unit 300. Furthermore, as shown in FIG. 15B, the dynamic compensation parameter interpolation unit 310 linearly interpolates the dynamic compensation parameters $W_{zy}(V_1)$ and $W_{zy}(V_2)$ to calculate the dynamic compensation parameter $W_{zy}(V)$ in the cutting volume V per unit time calculated by the cutting load calculation unit 300. The dynamic compensation parameter interpolation unit 310 outputs the calculated dynamic compensation parameters $W_{zx}(V)$ and $W_{zy}(V)$ to the dynamic compensation unit 250.

Figure 16:
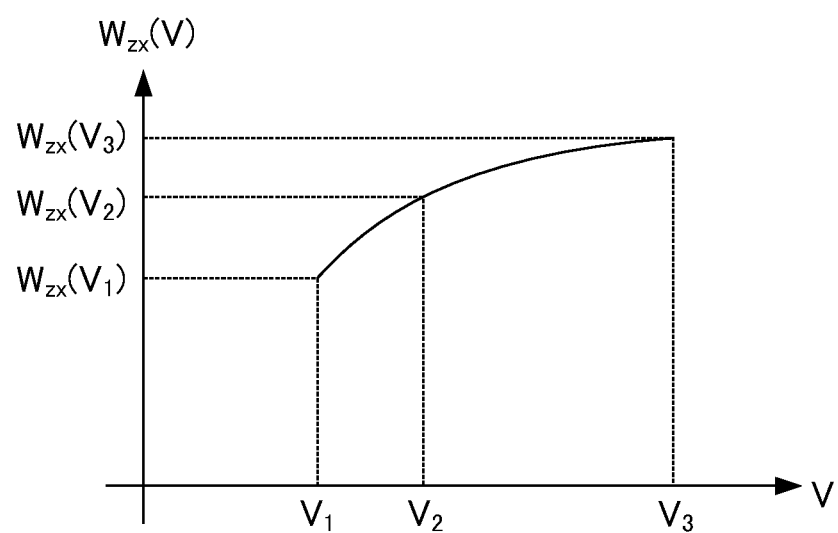
FIG. 16 is a diagram showing an example in which a plurality of dynamic compensation parameters is interpolated by an M-th order function.

It should be noted that, in a case in which N is 3 or more, the dynamic compensation parameter interpolation unit 310 may be best-fit by the M-th order function, as shown in FIG. 16, and may be determined by machine learning (M is an integer of 2 or more).

Furthermore, the dynamic compensation unit 250 compensates the dynamic error of the perpendicularity error with respect to the command coordinate value of the cutting command for the workpiece serving as an actual article based on the dynamic compensation parameters $W_{zx}(V)$ and $W_{zy}(V)$ calculated by the dynamic compensation parameter interpolation unit 310.

<Regarding Interpolation of Dynamic Compensation Parameter for Error Due to Deflection of Tool 25>

As in the case of the perpendicularity error, the dynamic compensation parameter interpolation unit 310 linearly interpolates the dynamic compensation parameters $W_t(V_1)$ and $W_t(V_2)$ in each of the two cutting volumes $V_1$ and $V_2$, for example, to calculate the dynamic compensation parameter $W_t(V)$ in the cutting volume V calculated by the cutting load calculation unit 300. The dynamic compensation parameter interpolation unit 310 outputs the calculated dynamic compensation parameter $W_t(V)$ to the dynamic compensation unit 250.

It should be noted that, in a case in which N is 3 or more, the dynamic compensation parameter interpolation unit 310 may be best-fit by the M-th order function and may be obtained by machine learning (M is an integer of 2 or more).

Furthermore, the dynamic compensation unit 250 compensates the dynamic error of the error due to the deflection of the tool 25 with respect to the command coordinate value of the cutting command for the workpiece serving as an actual article based on the dynamic compensation parameter $W_t(V)$ calculated by the dynamic compensation parameter interpolation unit 310.

As described above, the numerical control device 10 of the second embodiment acquires the measurement data of the shape of the test workpiece cut in each of a plurality of different cutting volumes from each other (cutting load), and calculates the dynamic compensation parameter for each cutting volume based on the command shape and the measurement data in each of the plurality of cutting volumes. The numerical control device 10 interpolates the dynamic compensation parameter in any cutting volume using the calculated dynamic compensation parameter for each cutting volume, and compensates the command coordinate value of the cutting command based on the dynamic compensation parameter in any interpolated cutting volume.

Thus, it is possible for the numerical control device 10 to accurately compensate the dynamic error without using a sensor for detecting the pressure due to deflection of the tool.

Furthermore, it is possible for the numerical control device 10 to compensate the dynamic error appropriately even when the magnitude of the cutting load at the time of machining of the test workpiece differs from the magnitude of the cutting load at the time of machining of the workpiece serving as the actual article.

The second embodiment has been described above.

Modification Examples of Second Embodiment

In the second embodiment described above, the numerical control device 10 compensates the dynamic error with respect to the command coordinate value of the cutting command generated by analyzing the machining program by adding the configuration of FIG. 14 to the numerical control device 10 of FIG. 1; however, the present invention is not limited thereto. For example, the numerical control device 10 may add the compensation pulse for compensating the dynamic error to the pulses to be outputted to the X-axis servo motor 31, the Y-axis servo motor 32, and the Z-axis servo motor 33 of the machine tool 20 by adding the configuration of FIG. 14 to the numerical control device 10 of FIG. 11.

Alternatively, the numerical control device 10 may add the configuration of FIG. 14 to the numerical control device 10 of FIG. 12 to incorporate the compensation amount of the dynamic compensation to the tool radius of the tool 25, thereby compensating the dynamic error.

Third Embodiment

Next, a third embodiment will be described. In the third embodiment, in addition to the function of the first embodiment, the numerical control device 10 acquires a load current at the time of cutting of a test workpiece, calculates the relationship parameter indicating the relationship between the load current and the cutting point load of each axis based on the acquired load current, the deviation amount between the command shape and the measurement data, and the dynamic compensation parameter, and calculates the cutting point load based on the relationship parameter and the load current.

With such a configuration, the numerical control device 10 according to the third embodiment can estimate the cutting point load without additionally modifying hardware and without requiring additional hardware.

Hereinafter, the third embodiment will be described.

Figure 17:
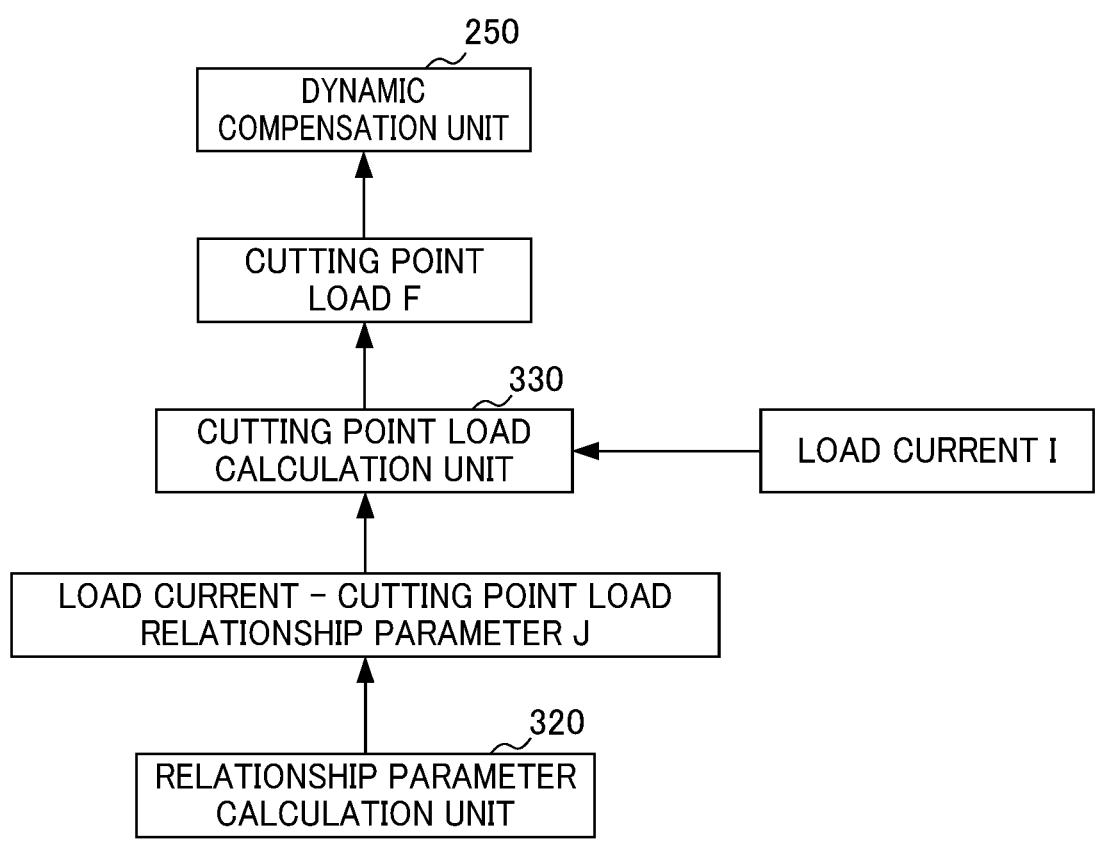
FIG. 17 is a functional block diagram showing a functional configuration example added to the numerical control device according to the first embodiment in a numerical control device according to the third embodiment.

FIG. 17 is a functional block diagram showing a functional configuration example added to the numerical control device 10 of the first embodiment in the numerical control device according to a third embodiment. Elements having the same functions as those of the elements of the numerical control device 10 of FIG. 1 are denoted by the same reference numerals, and a detailed description thereof is omitted.

As shown in FIG. 17, the control unit 200 further includes a relationship parameter calculation unit 320, and a cutting point load calculation unit 330. Each of these functional units is realized by the control unit 200 executing a system program and an application program stored in ROM (not shown) of the control unit 200.

The relationship parameter calculation unit 320 acquires the load current from the X-axis servo motor 31, the Y-axis servo motor 32, and the Z-axis servo motor 33 at the time of cutting of the test workpiece 50. The relationship parameter calculation unit 320 calculates a relationship parameter indicating the relationship between the load current and the cutting point load at least in the X-axis and Y-axis based on the load current acquired, the deviation amount δ between the command shape and the measurement data, and the dynamic compensation parameter.

Figure 18A:
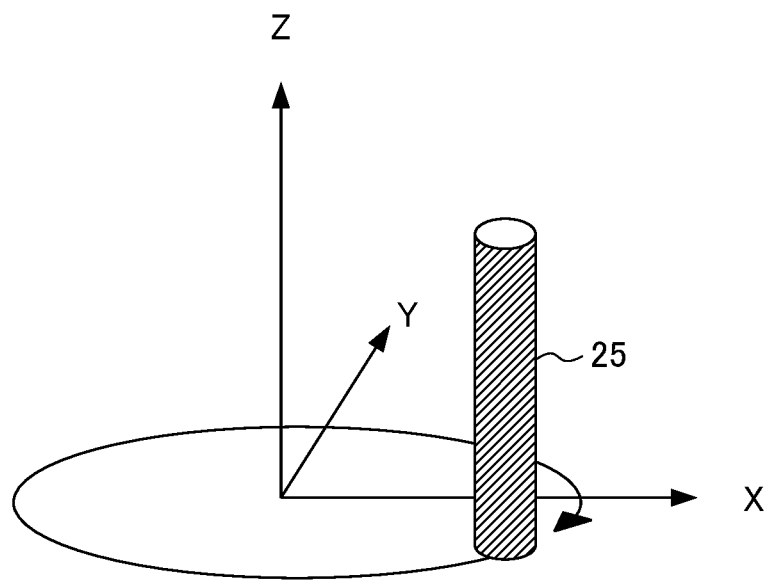
FIG. 18A is a diagram showing an example of a case in which a tool is moved in a circular motion in the clockwise direction.

More specifically, in order to calculate the relationship parameter indicating the relationship between the load current and the cutting point load in the X-axis and Y-axis, as shown in FIG. 18A, the relationship parameter calculation unit 320 causes the XY-plane to move in a circular motion in the clockwise direction at a constant velocity without performing cutting by the tool 25 attached to the spindle head 24. Since the tool 25 does not move in the Z-axis direction, the relationship parameter calculation unit 320 acquires the load current of the X-axis servo motor 31 and the Y-axis servo motor 32 when the tool 25 is moving in a circular motion. In this case, the load current $I_1(\theta)$ is expressed as $(I_{1x}(\theta), I_{1y}(\theta))$. It should be noted that $\theta$ indicates the phase of the circular motion.

Figure 18B:
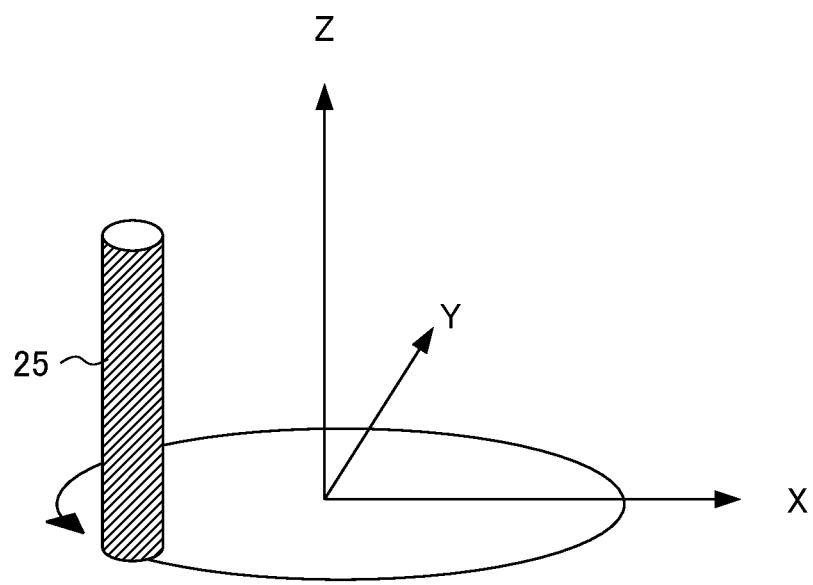
FIG. 18B is a diagram showing an example of a case in which the tool is moved in a circular motion in the counterclockwise direction.

Similarly, as shown in FIG. 18B, the relationship parameter calculation unit 320 causes the XY-plane to move in a circular motion at a constant velocity, as in the case of the clockwise direction, but in the anti-clockwise direction without performing cutting by the tool 25 attached to the spindle head 24. Since the tool 25 does not move in the Z-axis direction, the relationship parameter calculation unit 320 acquires the load current of the X-axis servo motor 31, Y-axis servo motor 32 when the tool 25 is circularly moved. In this case, the load current $I_2(\theta)$ is expressed as $(I_{2x}(\theta), I_{2y}(\theta))$.

Here, the direction of the acceleration of the load current $I_1(\theta)$ and the load current $I_2(\theta)$ is the same in the normal line direction; whereas, the direction of the velocity of the load current $I_1(\theta)$ and the load current $I_2(\theta)$ is opposite in the tangential direction. In view of this, $I_1(\theta)+I_2(\theta)$ is not affected by the influence of the velocity, and hence, is affected by only the influence of acceleration. On the contrary, $I_1(\theta)-I_2(\theta)$ is not affected by the influence of acceleration, and hence, is affected by only the influence of the velocity.

Therefore, the relationship parameter calculation unit 320 calculates an ellipse that best-fits $I_1(\theta)+I_2(\theta)$ indicating the influence of acceleration $((x/R_{ax})^2+(y/R_{ay})^2=1)$, for example, by the least squares method or the like. Furthermore, the relationship parameter calculation unit 320 calculates an ellipse that best-fits $I_1(\theta)-I_2(\theta)$ indicating the influence of velocity $((x/R_{vx})^2+(y/R_{vy})^2=1)$, for example, by the least squares method or the like. Thus, $I_1(\theta)+I_2(\theta)$ and $I_1(\theta)-I_2(\theta)$ are expressed by Expression 10.

$$I_1(\theta)+I_2(\theta)=(R_{ax}\cos\theta, R_{ay}\sin\theta)$$

$$I_1(\theta)-I_2(\theta)=(R_{ax}\sin\theta, -R_{vy}\cos\theta) \quad \text{[Expression 10]}$$

On the other hand, in the case of the proportional coefficient $K_x$ of the acceleration and torque of the X-axis, the proportional coefficient $K_y$ of the acceleration and torque of the Y-axis, the proportional coefficient $L_x$ of the velocity and torque of the X-axis, and the proportional coefficient $L_y$ of the velocity and torque of the Y-axis, the load currents $I_1(\theta)$ and $I_2(\theta)$ are expressed as in Expression 11. It should be noted that a indicates acceleration, and v indicates velocity.

$$I_1(\theta)=(K_x\cos\theta, K_y\sin\theta)a+(L_x\sin\theta, -L_y\cos\theta)v$$

$$I_2(\theta)=(K_x\cos\theta, K_y\sin\theta)a-(L_x\sin\theta, -L_y\cos\theta)v \quad \text{[Expression 11]}$$

Furthermore, $I_1(\theta)+I_2(\theta)$ and $I_1(\theta)-I_2(\theta)$ are expressed by Expression 12 using the load current $I_1(\theta)$ and $I_2(\theta)$ of Expression 11.

$$I_1(\theta)+I_2(\theta)=2(K_x\cos\theta, K_y\sin\theta)a$$

$$I_1(\theta)-I_2(\theta)=2(L_x\sin\theta, -L_y\sin\theta)v \quad \text{[Expression 12]}$$

Thus, the proportional coefficients $K_x$ and $K_y$ of acceleration and torque of the X-axis and Y-axis (the relationship parameter between acceleration and load current), and the proportional coefficients $L_x$ and $L_y$ of velocity and torque of the X-axis and Y-axis (the relationship parameter between velocity and load current) are expressed as in Expression 13 using the values $R_{ax}$, $R_{ay}$, $R_{vx}$, $R_{vy}$, a, and v in Expression 10.

$$K_x = \frac{R_{ax}}{2a}, K_y = \frac{R_{ay}}{2a}, L_x = \frac{R_{vx}}{2v}, L_y = \frac{R_{vy}}{2v} \quad \text{[Expression 13]}$$

In other words, the relationship parameter calculation unit 320 calculates the load current $I_1(\theta)$ and $I_2(\theta)$, the relationship parameters $K_x$ and $K_y$ of acceleration and load current, and the relationship parameters $L_x$ and $L_y$ of velocity and load current from Expressions 10 and 13. Furthermore, the relationship parameter calculation unit 320 outputs the calculated relationship parameters $K_x$ and $K_y$ of acceleration and the load current and the calculated relationship parameters $L_x$ and $L_y$ of velocity and the load current to the cutting point load calculation unit 330 to be described later. It should be noted that the relationship parameter calculation unit 320 may store the calculated relationship parameters $K_x$ and $K_y$ of acceleration and the load current and the calculated relationship parameters $L_x$ and $L_y$ of velocity and the load current in the storage unit 100.

Next, as in the case of the first embodiment, in order to calculate the dynamic compensation parameters $W_{zx}$ and $W_{zy}$ for the perpendicularity error, or the dynamic compensation parameter $W_t$ for the error due to the deflection of the tool 25, the numerical control device 10 causes the machine tool 20 to cut a hole having the radius $R_0$ in the test workpiece 50 fixed to the jig 40 in the XY-plane with the height in the Z-axis direction constant.

Thereafter, the numerical control device 10 causes the machine tool 20 to measure on-machine the cut hole with a contact probe (not shown). The measurement unit 210 of the numerical control device 10 acquires measurement data indicating the shape of the test workpiece 50 measured on-machine from the machine tool 20.

As in the case of the first embodiment, the dynamic compensation parameter calculation unit 220 calculates the dynamic compensation parameters $W_{zx}$ and $W_{zy}$ for the perpendicularity error or the dynamic compensation parameter $W_t$ for the error due to the deflection of the tool 25 based on the command shape indicated by the cutting command by which the test workpiece 50 was cut and the acquired measurement data.

Furthermore, the relationship parameter calculation unit 320 acquires the load currents $I_f(X)$ and $I_f(Y)$ from the X-axis servo motor 31 and the Y-axis servo motor 32 at the time of cutting of the test workpiece 50. The relationship parameter calculation unit 320 uses the acquired load currents $I_f(X)$ and $I_f(Y)$ at the time of cutting to calculate the proportional coefficient $J_x$ of the load current and the cutting point load F of the X-axis (the relationship parameter of the load current and the cutting point load), and the proportional coefficient $J_y$ of the load current and the cutting point load F of the Y-axis (the relationship parameter of the load current and the cutting point load).

Hereinafter, the calculation of the relationship parameter of the load current and the cutting point load in the perpendicularity error, and the calculation of the relationship parameter of the load current and the cutting point load in the deflection of the tool 25 will be described, respectively.

<Regarding Calculation of Relationship Parameter of Load Current and Cutting Point Load in Perpendicularity Error>

The perpendicularity error generated by cutting of the test workpiece 50 is due to the rigidity between axes of the machine tool 20 being low. Therefore, the relationship parameter calculation unit 320 calculates an ellipse $((x/I_{fx})^2+(y/I_{fy})^2=1)$ that best-fits the acquired load current $I_f(=(I_f(X), I_f(Y)))$, for example, by the least squares method or the like. It should be noted that $I_{fx}$ is the radius in the X-axis direction of the ellipse, and $I_{fy}$ is the radius in the Y-axis direction of the ellipse.

Here, based on Expression 5, the deviation amount $\delta$ $(=(R_0-R_x, R_0-R_y))$ is expressed by the height (coordinate value) z of the machining, the dynamic compensation parameters $W_{zx}$ and $W_{zy}$ of the perpendicularity error, and the cutting point load F, and is hence, expressed as in Expression 14.

$$(R_0-R_x, R_0-R_y)=(zW_{zx}J_xI_{fx}, zW_{zy}J_yI_{fy})  \quad \text{[Expression 14]}$$

It should be noted that the reason it is necessary to determine the relationship parameters of the load current and the cutting point load (proportional coefficient) $J_x$ and $J_y$ is that the cutting point loads F generated differ from each other in the X-axis and in the Y-axis even at the same load current.

The relationship parameter calculation unit 320 can calculate the relationship parameters $J_x$ and $J_y$ of the load current and the cutting point load using Expression 15 modified from Expression 14, the calculated $I_{fx}$ and $I_{fy}$, the dynamic compensation parameters $W_{zx}$ and $W_{zy}$ read from the dynamic compensation parameter data 120, and $R_0$, $R_x$, and $R_y$ calculated by the dynamic compensation parameter calculation unit 220.

$$(J_x, J_y) = \left( \frac{R_0 - R_x}{zW_{zx}I_{fx}}, \frac{R_0 - R_y}{zW_{zy}I_{fy}} \right) \quad \text{[Expression 15]}$$

Furthermore, the relationship parameter calculation unit 320 outputs the relationship parameters $J_x$ and $J_y$ of the calculated load current and the cutting point load to the cutting point load calculation unit 330. It should be noted that the relationship parameter calculation unit 320 may store the relationship parameters $J_x$ and $J_y$ of the calculated load current and the cutting point load in the storage unit 100.

At the time of cutting of the workpiece serving as the actual article, the cutting point load calculation unit 330 calculates the load current $I_f$ of the cutting based on the relationship parameters $K_x$ and $K_y$ of the acceleration and the load current calculated by the relationship parameter calculation unit 320 and the relationship parameters $L_x$ and $L_y$ of the velocity and the load current, the load current I at the time of machining of the workpiece serving as the actual article acquired from the X-axis servo motor 31, the Y-axis servo motor 32, and the Z-axis servo motor 33, and Expression 16.

$$I_f = I - (K_xa_x, K_ya_y) - (L_xv_x, L_yv_y) \quad \text{[Expression 16]}$$

It should be noted that Expression 16 is acquired since the load current I becomes the sum of the load current due to acceleration, the load current due to velocity, and the load current $I_f$ of the cutting. In addition, $a_x$ indicates the acceleration in the X-axis direction. $a_y$ indicates the acceleration in the Y-axis direction. $v_x$ indicates the velocity in the X-axis direction. $v_y$ indicates the velocity in the Y-axis direction.

Furthermore, the cutting point load calculation unit 330 calculates the cutting point load F by using the relationship parameters $J_x$ and $J_y$ of the load current and the cutting point load calculated by the relationship parameter calculation unit 320, the calculated load current $I_f$, and Expression 17.

$$F=(J_xI_{fx}, J_yI_{fy}) \quad \text{[Expression 17]}$$

The dynamic compensation unit 250 calculates the deviation amount δ from the dynamic compensation parameters $W_{zx}$ and $W_{zy}$ read from the dynamic compensation parameter data 120, the cutting point load F calculated by the cutting point load calculating unit 330, and Expression 5. The dynamic compensation unit 250 compensates the dynamic error of the perpendicularity error with respect to the command coordinate value of the cutting command for the workpiece serving as an actual article based on the calculated shift amount δ.

<Regarding Calculation of Relationship Parameters of Load Current and Cutting Point Load in Deflection of Tool 25>

Although there is no anisotropy in the deflection of the tool 25, the magnitude of the load current for generating the same cutting point load is different depending on the inertia of an axis and motor characteristics. Therefore, in order to generate a cutting point load, the radius becomes larger in the axial direction where a large current is required (the axial direction where the inertia is large), and the radius is smaller in the axial direction where a small current is required (the axial direction where the inertia is small).

Therefore, the relationship parameter calculation unit 320 calculates an ellipse $((x/I_{ftx})^2+(y/I_{fty})^2=1)$ that best-fits the load current $I_f$ $(=(I_f(X), I_f(Y))$ acquired at the time of the cutting of the test workpiece 50, for example, by the least squares method or the like. It should be noted that $I_{ftx}$ is the radius in the X-axis direction of the ellipse, and $I_{fty}$ is the radius in the Y-axis direction of the ellipse.

Here, based on Expression 7, the deviation amount δ $(=(R_0-R_t, R_0-R_t))$ is expressed by the tool length $L_t$, the dynamic compensation parameter $W_t$, and the cutting point load F, and hence, is expressed as Expression 18.

$$(R_0-R_t, R_0-R_t)=L_tW_t(J_xI_{ftx}, J_yI_{fty}) \quad \text{[Expression 18]}$$

The relationship parameter calculation unit 320 can calculate the relationship parameters $J_x$ and $J_y$ of the load current and the cutting point load by using Expression 19 modified from Expression 18, the calculated $I_{ftx}$ and $I_{fty}$, the dynamic compensation parameter $W_t$ read from the dynamic compensation parameter data 120, and $R_0$ and $R_t$ calculated by the dynamic compensation parameter calculation unit 220.

$$(J_x, J_y) = \frac{R_0 - R_t}{L_tW_t}\left( \frac{1}{I_{ftx}}, \frac{1}{I_{fty}} \right) \quad \text{[Expression 19]}$$

Furthermore, the relationship parameter calculation unit 320 outputs the relationship parameters $J_x$ and $J_y$ of the calculated load current and the cutting point load to the cutting point load calculation unit 330. It should be noted that the relationship parameter calculation unit 320 may store the relationship parameters $J_x$ and $J_y$ of the calculated load current and the cutting point load in the storage unit 100.

At the time of cutting of the workpiece serving as an actual article, the cutting point load calculation unit 330 calculates the load current $I_f$ of the cutting based on the relationship parameters $K_x$ and $K_y$ of the acceleration and the load current calculated by the relationship parameter calculation unit 320 and the relationship parameters $L_x$ and $L_y$ of the velocity and the load current, the load current I at the time of machining of the workpiece serving as the actual article acquired from the X-axis servo motor 31, the Y-axis servo motor 32, and the Z-axis servo motor 33, and Expression 16.

Furthermore, the cutting point load calculation unit 330 calculates the cutting point load F by using the relationship parameters $J_x$ and $J_y$ of the load current and the cutting point load calculated by the relationship parameter calculation unit 320, the calculated load current $I_f$, and Expression 17.

The dynamic compensation unit 250 calculates the deviation amount δ from the dynamic compensation parameter $W_t$ read from the dynamic compensation parameter data 120, the cutting point load F calculated by the cutting point load calculation unit 330, and Expression 7. The dynamic compensation unit 250 compensates the dynamic error of the error due to the deflection of the tool 25 with respect to the command coordinate value of the cutting command for the workpiece serving as an actual article based on the calculated deviation amount δ.

As described above, the numerical control device 10 of the third embodiment acquires the load current at the time of the cutting of the test workpiece 50, and calculates the relationship parameters $J_x$ and $J_y$ of the load current and the cutting point load based on the load current acquired, the deviation amount δ of the command shape and the measurement data, and the dynamic compensation parameter. The numerical control device 10 calculates the cutting point load F based on the relationship parameters $J_x$ and $J_y$ of the load current and the cutting point load, and the load current I at the time of the cutting of the workpiece serving as the actual article, and compensates the dynamic error with respect to the command coordinate value indicated by the cutting command based on the calculated cutting point load F and the dynamic compensation parameter.

With such a configuration, it is possible for the numerical control device 10 to accurately compensate the dynamic error without using a sensor.

In addition, it is possible for the numerical control device 10 to estimate the cutting point load without additionally modifying hardware and without requiring additional hardware.

The third embodiment has been described above.

Modification Examples of Third Embodiment

In the third embodiment described above, the numerical control device 10 compensates the dynamic error with respect to the command coordinate value of the cutting command generated by analyzing the machining program by adding the configuration of FIG. 17 to the numerical control device 10 of FIG. 1; however, the present invention is not limited thereto. For example, the numerical control device 10 may add the compensation pulse for compensating the dynamic error to the pulse to be output to the X-axis servo motor 31, the Y-axis servo motor 32, and the Z-axis servo motor 33 of the machine tool 20 by adding the configuration of FIG. 17 to the numerical control device 10 of FIG. 11.

Alternatively, the numerical control device 10 may add the configuration of FIG. 17 to the numerical control device 10 of FIG. 12 to incorporate the compensation amount of the dynamic compensation to the tool radius of the tool 25, thereby compensating the dynamic error.

Although the first to third embodiments have been described above, the numerical control device 10 is not limited to the above-described embodiments, and includes modifications, improvements, and the like within a scope that can achieve the object.

Modification Examples

In the first to third embodiments described above, the machine tool 20 is a machine tool having three orthogonal axes; however, the machine tool 20 may be a machine tool having five axes or the like.

The respective functions included in the numerical control device 10 according to the first to third embodiments can be realized by hardware, software, or a combination thereof. Here, being realized by software indicates being realized by a computer reading and executing a program.

Furthermore, each component included in the numerical control device 10 can be realized by hardware including an electronic circuit or the like, software, or a combination thereof.

The programs can be stored on any of various types of non-transitory computer readable media and provided to a computer. The non-transitory computer readable media include various types of tangible storage media. Examples of non-transient computer-readable media include magnetic recording media (e.g., flexible disks, magnetic tapes, hard disk drives), magnetic-optical recording media (e.g., magnetic-optical disks), CD-ROM (Read Only Memory), CD-R, CD-R/W, solid-state memory (e.g., mask ROM, PROM (Programmable ROM), EPROM (Erasable PROM, flash ROM, and RAM). The program may also be supplied to the computer by various types of temporary computer readable media. Examples of temporary computer readable media include electrical signals, optical signals, and radio waves. Temporary computer readable media can provide programs to the computer via wired communication paths, such as wires and optical fiber, or via wireless communication paths.

It should be noted that a step of writing programs to be recorded on a recording medium includes processing that is performed in a time series manner according to the order and processing that is performed in a parallel or independent manner even if the processing is not necessarily performed in a time series manner.

In other words, the numerical control device of the present disclosure can assume various embodiments having the following configurations.

(1) The numerical control device 10 according to the present disclosure is a numerical control device that causes a machine tool 20 to perform cutting with a command coordinate value indicated by a cutting command received from a command analysis unit 230, the numerical control device 10 including: a measurement unit 210 that causes the machine tool 20 to measure on-machine a shape of a cut test workpiece 50, and acquires measurement data indicating a shape of the test workpiece 50 measured; a dynamic compensation parameter calculation unit 220 that calculates a dynamic compensation parameter for compensating a dynamic error generated by a force acting on the machine tool 20 and a velocity upon cutting, based on a command shape indicated by the cutting command and the measurement data acquired by the measurement unit 210; and a dynamic compensation unit 250 that compensates the dynamic error with respect to the command coordinate value, based on the dynamic compensation parameter calculated, in which the dynamic compensation parameter calculation unit 220 acquires only the dynamic error from a comparison of the command shape and the measurement data, and calculates the dynamic compensation parameter from the dynamic error acquired.

According to the numerical control device 10, it is possible to accurately compensate the dynamic error without using a sensor.

(2) In the numerical control device 10 according to (1), the command shape and a shape of the test workpiece 50 may be circular.

In so doing, the numerical control device 10 can easily calculate dynamic compensation parameter.

(3) In the numerical control device 10 according to (2), the measurement unit 210 may acquire the measurement data of a hole having a radius $R_0$ which is cut in the test workpiece 50 in an XY-plane, and the dynamic compensation parameter calculation unit 220 may best-fit an ellipse to the shape of the test workpiece 50 indicated by the measurement data and acquire radii $R_x$ and $R_y$ of an X-axis and a Y-axis, respectively, of the ellipse, and calculate dynamic compensation parameters $W_{zx}$ and $W_{zy}$ in the XY-plane with Expression 20, $$W_{zx}=\delta_0/(H_z-H_w)$$

$$W_{zy}=\delta_{90}/(H_z-H_w) \quad \text{[Expression 20]}$$

wherein $H_z$ indicates a height from a table to an X-axis of the machine tool 20, $H_w$ indicates a height from the table to the test workpiece 50, $\delta_0$ and $\delta_{90}$ respectively indicate deviation amounts in a case in which an angle $\theta$ of a machining shape position ($R_x \cos(\theta+\alpha)$, $R_y \sin(\theta+\alpha)$) indicated by the measurement data is 0 degrees and 90 degrees, and $\alpha$ indicates a phase which is shifted by an inclination in a case in which the ellipse that is best-fit is inclined due to a load in a circumferential direction.

In so doing, the numerical control device 10 can calculate the dynamic compensation parameter of the perpendicularity error.

(4) In the numerical control device 10 according to (2), the measurement unit 210 may acquire the measurement data of the hole having the radius $R_0$ which is cut in the test workpiece 50 in an XY-plane, and the dynamic compensation parameter calculation unit 220 may best-fit the shape of the test workpiece 50 indicated by the measurement data to a circle and acquires a radius $R_t$ of the circle, and calculate a dynamic compensation parameter $W_t$ of a deflection amount of a tool included in the machine tool 20 generated from a cutting load and a tool radius compensation amount $r_t'$ with Expression 21, $$W_t=(R_0-R_t)/L_t \cos \beta$$

$$r_t'=r_t-L_t \cos \beta W_t \quad \text{[Expression 21]}$$

wherein $\beta$ indicates an angle between a normal line direction of a workpiece at a time of machining of the workpiece and a cutting point load direction, $r_t$ indicates a tool radius before compensation, and $L_t$ indicates a tool length.

In so doing, the numerical control device 10 may calculate the dynamic compensation parameter of the error due to deflection of the tool.

(5) the numerical control device 10 according to (1) or (2) may further include a dynamic compensation parameter interpolation unit 310, in which the measurement unit 210 may acquire the measurement data of a shape of the test workpiece 50 which is cut in each of a plurality of cutting loads which differ from each other, the dynamic compensation parameter calculation unit 220 may calculate the dynamic compensation parameter based on the command shape in each of the plurality of cutting loads and the measurement data, the dynamic compensation parameter interpolation unit 310 may interpolate a dynamic compensation parameter in any cutting load using a plurality of dynamic compensation parameters calculated, and the dynamic compensation unit 250 may compensate the command coordinate value of the cutting command based on the dynamic compensation parameter in the any cutting load interpolated.

In doing so, it is possible for the numerical control device 10 to accurately compensate the dynamic error, even when the magnitude of the cutting load at the time of the machining of the test workpiece 50 is different from the magnitude of the cutting load at the time of the cutting of the of the workpiece serving as an actual article.

(6) The numerical control device 10 according to (1) or (2) may further include: a relationship parameter calculation unit 320 that acquires a load current at a time of cutting of the test workpiece 50, and calculates a relationship parameter indicating a relationship between a load current and a cutting point load at least in an X-axis and a Y-axis based on the load current acquired, a deviation amount between the command shape and the measurement data, and the dynamic compensation parameter, and a cutting point load calculation unit 330 that calculates the cutting point load based on the relationship parameter and the load current.

In doing so, it is possible for the numerical control device 10 to estimate the cutting point load without additionally modifying the hardware and without requiring additional hardware.

(7) In the numerical control device 10 according to (6), the load current may be calculated by subtracting a load current due to acceleration at a time of accelerating a tool 25 included in the machine tool 20 and a load current due to an axial movement at a time of axially moving the tool 25, from a load current of a servo motor included in the machine tool 20.

In so doing, it is possible for the numerical control device 10 to calculate the load current $I_f$ of the cutting.

(8) In the numerical control device 10 according to (7), the load current due to the acceleration and the load current due to the axial movement may be calculated from a load current at a time of a movement of the tool 25 without cutting.

In so doing, it is possible for the numerical control device 10 to calculate the load current due to the acceleration at the time of idle machining, and the load current due to the axis movement.

(9) In the numerical control device (8), the movement of the tool 25 without cutting may perform both a movement to move the tool 25 in a circular motion in a clockwise direction, and a movement to move the tool 25 in a circular motion in an anti-clockwise direction.

In so doing, it is possible for the numerical control device 10 to calculate the load current due to acceleration and the load current due to axis movement.

(10) A control method of the present disclosure relates to a control method for causing a machine tool 20 to perform cutting with a command coordinate value indicated by a cutting command received from a command analysis unit 230, the control method being realized by a computer and comprising the steps of: causing the machine tool 20 to measure on-machine a shape of a cut test workpiece 50 and acquiring measurement data indicating a shape of the test workpiece 50 measured; calculating a dynamic compensation parameter for compensating a dynamic error generated by a force acting on the machine tool 20 and a velocity upon cutting, based on a command shape indicated by the cutting command and the measurement data acquired; and compensating the dynamic error with respect to the command coordinate value, based on the dynamic compensation parameter calculated, in which the calculating a dynamic compensation parameter includes acquiring only the dynamic error from a comparison of the command shape and the measurement data, and calculating the dynamic compensation parameter from the dynamic error acquired.

According to this control method, the same effect as in (1) can be acquired.

EXPLANATION OF REFERENCE NUMERALS

10 numerical control device
20 machine tool
25 tool 50 test workpiece
100 storage unit
200 control unit
210 measurement unit
220 dynamic compensation parameter calculation unit
230 command analysis unit
250 dynamic compensation unit
310 dynamic compensation parameter interpolation unit
320 relationship parameter calculation unit
330 cutting point load calculation unit

What is claimed is:

1. A numerical control device that causes a machine tool to perform cutting with a command coordinate value indicated by a cutting command received from a command analysis unit, the numerical control device comprising:
   a measurement unit that causes the machine tool to measure on-machine a shape of a circularly cut test workpiece, and acquires measurement data indicating a shape of the test workpiece measured;
   a dynamic compensation parameter calculation unit that calculates a dynamic compensation parameter for compensating a dynamic error generated by a force acting on the machine tool and a velocity upon cutting, based on a command shape indicated by the cutting command and a circular or elliptical shape acquired by best-fitting either a circle or an ellipse to the shape of the test workpiece indicated by the measurement data acquired by the measurement unit; and
   a dynamic compensation unit that compensates the dynamic error with respect to the command coordinate value, based on the dynamic compensation parameter calculated,
   wherein the dynamic compensation parameter calculation unit acquires only the dynamic error from a comparison of the command shape and the measurement data, and calculates the dynamic compensation parameter from the dynamic error acquired.

2. The numerical control device according to claim 1, wherein
   the measurement unit acquires the measurement data of a hole having a radius $R_0$ which is cut in the test workpiece in an XY-plane, and
   the dynamic compensation parameter calculation unit best-fits an ellipse to the shape of the test workpiece indicated by the measurement data and acquires radii $R_x$ and $R_y$ of an X-axis and a Y-axis, respectively, of the ellipse, and calculates dynamic compensation parameters $W_{zx}$ and $W_{zy}$ in the XY-plane with Expression 1, $$W_{zx} = \delta_0/(H_z - H_w)$$

$$W_{zy} = \delta_{90}/(H_z - H_w) \qquad \text{[Expression 1]}$$

wherein $H_z$ indicates a height from a table to an X-axis of the machine tool, $H_w$ indicates a height from the table to the test workpiece, $\delta_0$ and $\delta_{90}$ respectively indicate deviation amounts in a case in which an angle $\theta$ of a machining shape position ($R_x \cos(\theta+\alpha)$, $R_y \sin(\theta+\alpha)$) indicated by the measurement data is 0 degrees and 90 degrees, and $\alpha$ indicates a phase which is shifted by an inclination in a case in which the ellipse that is best-fit is inclined due to a load in a circumferential direction.

3. The numerical control device according to claim 1, wherein
   the measurement unit acquires the measurement data of the hole having the radius $R_0$ which is cut in the test workpiece in an XY-plane, and
   the dynamic compensation parameter calculation unit best-fits the shape of the test workpiece indicated by the measurement data to a circle and acquires a radius $R_t$ of the circle, and calculates a dynamic compensation parameter $W_t$ of a deflection amount of a tool included in the machine tool generated from a cutting load and a tool radius compensation amount $r_t'$ with Expression 2, $$W_t = (R_0 - R_t)/L_t \cos \beta$$

$$r_t' = r_t - L_t \cos \beta W_t \qquad \text{[Expression 2]}$$

wherein $\beta$ indicates an angle between a normal line direction of a workpiece at a time of machining of the workpiece and a cutting point load direction, $r_t$ indicates a tool radius before compensation, and $L_t$ indicates a tool length.

4. The numerical control device according to claim 1, further comprising a dynamic compensation parameter interpolation unit, wherein
   the measurement unit acquires the measurement data of a shape of the test workpiece which is cut in each of a plurality of cutting loads which differ from each other,
   the dynamic compensation parameter calculation unit calculates the dynamic compensation parameter based on the command shape and the measurement data in each of the plurality of cutting loads,
   the dynamic compensation parameter interpolation unit interpolates a dynamic compensation parameter in any cutting load using a plurality of dynamic compensation parameters calculated, and
   the dynamic compensation unit compensates the command coordinate value of the cutting command based on the dynamic compensation parameter in the any cutting load interpolated.

5. The numerical control device according to claim 1, further comprising:
   a relationship parameter calculation unit that acquires a load current at a time of cutting of the test workpiece, and calculates a relationship parameter indicating a relationship between a load current and a cutting point load at least in an X-axis and a Y-axis based on the load current acquired, a deviation amount between the command shape and the measurement data, and the dynamic compensation parameter, and
   a cutting point load calculation unit that calculates the cutting point load based on the relationship parameter and the load current.

6. The numerical control device according to claim 5, wherein the load current is calculated by subtracting a load current due to acceleration at a time of accelerating a tool included in the machine tool and a load current due to an axial movement at a time of axially moving the tool, from a load current of a servo motor included in the machine tool.

7. The numerical control device according to claim 6, wherein the load current due to the acceleration and the load current due to the axial movement are calculated from a load current at a time of a movement of the tool without cutting.

8. The numerical control device according to claim 7, wherein the movement of the tool without cutting performs both a movement to move the tool in a circular motion in a clockwise direction, and a movement to move the tool in a circular motion in an anti-clockwise direction.

9. A control method for causing a machine tool to perform cutting with a command coordinate value indicated by a cutting command received from a command analysis unit, the control method being realized by a computer and comprising the steps of:
- causing the machine tool to measure on-machine a shape of a circularly cut test workpiece and acquiring measurement data indicating a shape of the test workpiece measured;
- calculating a dynamic compensation parameter for compensating a dynamic error generated by a force acting on the machine tool and a velocity upon cutting, based on a command shape indicated by the cutting command and a circular or elliptical shape acquired by best-fitting either a circle or an ellipse to the shape of the test workpiece indicated by the measurement data acquired; and
- compensating the dynamic error with respect to the command coordinate value, based on the dynamic compensation parameter calculated,
- wherein the calculating a dynamic compensation parameter includes acquiring only the dynamic error from a comparison of the command shape and the measurement data, and calculating the dynamic compensation parameter from the dynamic error acquired.

* * * * *